(12) United States Patent
Valchok et al.

(10) Patent No.: US 11,796,335 B2
(45) Date of Patent: Oct. 24, 2023

(54) METHOD OF AND SYSTEM FOR CONTROLLING OPERATION OF SELF-DRIVING CAR

(71) Applicant: YANDEX SELF DRIVING GROUP LLC, Moscow (RU)

(72) Inventors: Andrei Yurievich Valchok, Minsk (BY); Kanstantsin Eduardovich Charkin, p. Polyana (BY)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 232 days.

(21) Appl. No.: 17/238,120

(22) Filed: Apr. 22, 2021

(65) Prior Publication Data
US 2021/0331670 A1 Oct. 28, 2021

(30) Foreign Application Priority Data
Apr. 23, 2020 (RU) .......................... RU2020114522

(51) Int. Cl.
*G01C 21/36* (2006.01)
*B60W 60/00* (2020.01)
(Continued)

(52) U.S. Cl.
CPC ..... *G01C 21/3658* (2013.01); *B60W 30/0953* (2013.01); *B60W 30/0956* (2013.01);
(Continued)

(58) Field of Classification Search
CPC ............. G01C 21/3658; G05D 1/0011; B60W 60/001; B60W 30/0953; B60W 30/0956;
(Continued)

(56) References Cited

U.S. PATENT DOCUMENTS

2014/0278052 A1 9/2014 Slavin et al.
2017/0364083 A1 12/2017 Yang et al.
(Continued)

FOREIGN PATENT DOCUMENTS

CN 107067710 A 8/2017
CN 105675000 B 6/2018
(Continued)

OTHER PUBLICATIONS

European Search Report dated Sep. 14, 2021 issued in respect of the European counterpart Application No. 21167512.9.
(Continued)

*Primary Examiner* — Dale W Hilgendorf
*Assistant Examiner* — Hana Lee
(74) *Attorney, Agent, or Firm* — BCF LLP

(57) ABSTRACT

Method and device for controlling operation of a Self-Driving Car. The method includes determining route-level and lane-level information for generating a graph-structure, applying a first model for assigning costs to respective edges, determining scores for vertices based on the costs, storing the edges with the costs and the vertices with the scores. The method also includes at a given moment in time during operation: acquiring a lane path indicative of a lane segment extending from the current location without a lane-changing manoeuvre. The method includes, for the lane path: identifying a series of vertices covered by the lane segment, applying a second model for assigning additional costs to lane-path-departing edges of the series of vertices thereby determining locally-increased costs, determining a locally-adjusted scores for vertices in the series of vertices based on the locally-increased costs, and identifying a lane path score for the lane path based on the locally-adjusted scores.

17 Claims, 18 Drawing Sheets

(51) Int. Cl.
    *B60W 30/095*      (2012.01)
    *G05D 1/00*      (2006.01)

(52) U.S. Cl.
    CPC ..... *B60W 60/001* (2020.02); *B60W 2420/403* (2013.01); *B60W 2552/53* (2020.02); *B60W 2554/4045* (2020.02); *B60W 2554/4049* (2020.02); *G05D 1/0011* (2013.01)

(58) Field of Classification Search
    CPC ..... B60W 2552/53; B60W 2554/4045; B60W 2554/4049; B60W 2420/403
    See application file for complete search history.

(56) References Cited

U.S. PATENT DOCUMENTS

| | | | |
|---|---|---|---|
| 2018/0051991 A1* | 2/2018 | Hong | G01C 21/3446 |
| 2018/0238697 A1 | 8/2018 | Maru et al. | |
| 2018/0251126 A1 | 9/2018 | Linscott et al. | |
| 2020/0097014 A1* | 3/2020 | Wang | G06Q 10/047 |
| 2020/0182633 A1* | 6/2020 | Liu | G01C 21/3815 |
| 2020/0377085 A1* | 12/2020 | Floyd-Jones | B60W 30/09 |
| 2021/0253128 A1* | 8/2021 | Nister | G05D 1/0212 |

FOREIGN PATENT DOCUMENTS

| | | |
|---|---|---|
| DE | 102013212776 A1 | 1/2015 |
| DE | 112015000359 T5 | 10/2016 |
| DE | 102017109400 A1 | 11/2017 |

OTHER PUBLICATIONS

English Specification of CN105675000B as provided by the EPO.
Russian Search Report dated Sep. 16, 2021 in respect of the counterpart Russian Patent Application RU 2020114522.

* cited by examiner

METHOD OF AND SYSTEM FOR CONTROLLING OPERATION OF SELF-DRIVING CAR

CROSS-REFERENCE

The present application claims priority to Russian Patent Application No. 2020114522, entitled "Method of and System for Controlling Operation of Self-Driving Car", filed Apr. 23, 2020, the entirety of which is incorporated herein by reference.

FIELD OF TECHNOLOGY

The present technology relates to self-driving cars and, specifically, to a method of and a system for controlling operation of self-driving cars.

BACKGROUND

Several computer based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with a collision control system, which systems upon detection of the vehicle (or other obstacle) in front of the moving vehicle, slow down or stop the vehicle.

Some of the more advanced system provide for a fully autonomous driving of the vehicle without direct control from the operator (i.e. the driver), so-called Self-Driving Cars (SDCs). A given SDC includes computer systems that can cause the SDC to accelerate, brake, stop, change lane and self-park.

One of the technical challenges in implementing the above computer systems is planning operation of the SDC when travelling along a route.

SUMMARY

It is an object of the present technology to ameliorate at least some of the shortcomings or inconveniences present in the prior art. Embodiments of the present technology may provide and/or broaden the scope of approaches to methods of achieving the aims and objects of the present technology.

A Self-Driving Car (SDC) can be controlled in order to travel from a point A to a point B. For example, an electronic device may be configured to control operation of the SDC such that it travels from an origin A to a destination B. To that end, the electronic device may be configured to determine a navigational route that the SDC may take for travelling from A to B, and may also be configured to control operation of the SDC for doing so.

Developers of the present technology have devised methods and systems for reducing the likelihood of performing lane-changing manoeuvres during operation of the SDC when travelling on the navigational route. Indeed, it should be noted that a large number of lane-level alternatives may be available for travelling on a given route (from the origin A to the destination B) and some of these lane-level alternatives may involve more or less lane-changing manoeuvres.

Developers of the present technology have also devised methods and systems may make use of two scoring models for evaluating which lane-level alternative the SDC ought to be following for reducing the number of lane-changing manoeuvres. It at least some embodiments of the present technology, it can be said that the electronic device may be configured to make use of a first "global scoring model" for determining desirability of different lane-level transitions that the SDC may potentially perform while travelling along the navigational route, and then may make use of a "local scoring model" for adjusting desirability of some lane-level transitions based on current information about the surroundings of the SDC so as to reduce the likelihood of the SDC performing a given lane-changing manoeuvre and/or to reduce a total number of lane-changing manoeuvres that the SDC will perform while following the route.

In at least some embodiments, developers of the present technology have devised a system comprising a lane-planning module, route planner, traffic rules module, perception module, trajectory planning module and a set of sensors. This system may be implemented in association with an SDC. The lane-planning module may include a variety of submodules, such as but not limited to: a lane splitter, a global scoring model, a storage and/or a database storing a graph-structure and a second scoring model.

The set of sensors may be configured to continuously receive data representative of the surroundings of the SDC, including but not limited to data about a current location of the SDC, a neighboring lane occupancy status, data representative of static and dynamic obstacles, their respective locations in the neighboring lanes, geometric sizes and kinematic characteristics thereof, and the like. The data generated by the set of sensors may be provided to the perception module. The perception module may also be in communication with the lane-planner module. The lane-planner module may receive data representative of surroundings and environment for further data processing.

It should be noted that in some embodiments, the route planner may have access to a road map. The route planner may be configured to generate a navigational route beginning at the origin A and ending at the destination B. It should be noted that the route planner may be configured to generate so-called "route-level" information indicative of one or more roads that the SDC is to take for arriving to the destination B from the origin A.

It is contemplated that the traffic rules module may have access to traffic rules for the one or more roads of the navigational route, including but not limited to: types of lane dividers, number of lanes, traffic direction of corresponding lanes, and the like. The traffic rules may be used by the lane splitter module for splitting the route into lanes according to the traffic rules. It should be noted that the lane splitter module may be configured to determine so-called "lane-level" information about the navigational route which is indicative of presence of one or more lanes on respective ones of the one or more road of the navigational route. For example, the lane splitter module may be configured to make an association between a given road of the route and its lane(s).

In some embodiments, the system may make use of a global scoring model. In general, the global scoring model is associated with a set of desirability criteria to be used for evaluating desirability of different lane-level transitions that the SDC may perform while following the navigational route. For example, some of the desirability criteria may be based on traffic rules (e.g., illegal lane-level transitions are less desirable than legal ones, or may be forbidden altogether other than for emergency maneuvers) while others may be based on safety considerations (lane-level transitions corresponding to lane-changing manoeuvres are less desirable than lane-level transitions corresponding to the SDC keeping its lane, rapid lane-changing manoeuvres are less desirable than slow lane-changing manoeuvres, and the like). The system may be configured to generate a given graph-structure representing potential locations of the SDC along the route and respective lane-level transitions. As such, the global scoring model may be used to assign costs to respective lane-level transitions and which are indicative of the desirability of such a lane-level transition.

In some embodiments, the system may also make use of a second scoring model. As it will be discussed in greater detail herein below, the second scoring model may be used to differentiate between different types of lane-level transitions and to adjust the costs of at least some one type of lane-level transitions. It should be noted that the second scoring model may be used during operation of the SDC. Hence, it is contemplated that the second scoring model may be configured to differentiate between different types of lane-level transitions at least partially based on current information about the surroundings of the SDC.

In some embodiments, the lane planner may be configured to assign anchor points to different lanes of different roads of the navigational route and which correspond to potential locations in which the SDC may find itself while travelling along the route. The anchor points may be so-assigned at intervals of 5 m, for example. The length of intervals may depend on computational capacity and storage capacity of the lane-planning module of the SDC. The anchor points are used to build a graph-structure. Broadly speaking, the graph-structure includes vertices associated with respective potential locations of the SDC along the navigational route, and edges connecting pairs of vertices and which are indicative of respective transitions between the respective pairs of potential locations.

The system may use the first scoring model for assigning costs to edges of the graph-structure, which are indicative of desirability of respective transitions, as explained above. It is contemplated that the system may employ the first scoring model prior to the SDC beginning operation along the route. Therefore, it can be said that the system may not require information about the surrounding of the SDC in order to make use of the first scoring model.

In some embodiments, once the edges are assigned with respective costs, the system may employ one or more dynamic programming method(s) for assigning penalty scores to respective vertices of the graph-structure and where a given penalty score is indicative of a lowest cumulative cost of edges connecting the respective vertex to a vertex associated with the destination B. In some embodiments, the system may store in a storage and/or database the graph-structure with the so-assigned costs and the so-determined penalty costs for use during operation of the SDC on the route.

It is contemplated that the system may make use of the second scoring model in real-time, during operation of the SDC along the navigational route. As it will be described in greater detail herein further below, the system may acquire data representative of "lane paths" currently available for the SDC (as part of the information indicative of the surroundings of the SDC) and where a given lane path is indicative of a respective lane segment extending from the current location and which the SDC can follow without performing a lane-changing manoeuvre. It should also be noted that the second scoring model may be able to differentiate between lane-path-following edges in the graph-structure and lane-path-departing edges in the graph-structure. Accordingly, the second scoring model may be used for assigning additional costs to lane-path-departing edges.

In a first broad aspect of the present technology, there is provided a method of controlling operation of a Self-Driving Car (SDC). The SDC is associated with an electronic device. The electronic device has access to data representative of an origin location and a destination location. The method is executable by the electronic device. The method comprises determining, by the electronic device, a route-level navigation information for the SDC to travel from the origin location to the destination location, where the route-level navigation information is indicative of at least one road that the SDC is to travel on from the origin location to the destination location. The at least one road is associated with traffic rules. The method comprises using, by the electronic device, the traffic rules for determining lane-level information, where the lane-level information is indicative of presence of at least one lane on each of the at least one road. The method comprises using, by the electronic device, the lane-level information for generating a graph-structure, where the graph-structure includes a plurality of vertices and a plurality of edges. A given vertex is associated with a respective potential location of the SDC on a given lane of a given road of the at least one road. The plurality of vertices includes an origin vertex associated with the origin location and a destination vertex associated with the destination location. A given edge connects a respective pair of vertices in the graph-structure, The given edge is indicative of a transition between the potential location associated with a first one of the respective pair of vertices and the potential location associated with the second one of the respective pair of vertices. The method comprises applying, by the electronic device, a global scoring model onto the graph-structure. The global scoring model is associated with a first set of criteria for assigning costs to respective edges. A given cost assigned to a respective edge is indicative of a desirability of the respective transition in accordance with the first set of criteria. The method comprises determining, by the electronic device, a global penalty score for each vertex in the graph-structure. A given global penalty score for a respective vertex is a lowest cumulative cost of edges connecting a respective vertex and the destination vertex. The given global penalty score is indicative of a lowest global cost for the SDC for travelling to the destination location if the SDC finds itself in the potential location of the respective vertex. The method comprises storing, by the electronic device, the edges of the graph-structure in association with the respective costs and the vertices of the graph-structure in association with the respective global penalty scores. The method comprises, at a given moment in time during operation of the SDC when the SDC is located at a current location between the origin location and the destination location, acquiring, by the electronic device, at least one lane path for the current location. The at least one lane path is indicative of a respective lane segment extending from the current location without a lane-changing manoeuvre. The method comprises for each one of the at least one lane path identifying, by the electronic device, a series of vertices from the graph-structure covered by the respective lane segment of a respective lane path. A given series of vertices (i) begins at a current vertex associated with a respective potential location that corresponds to the current location of the SDC, and (ii) ends at a respective end vertex associated with a respective potential location that corresponds to an end of the respective lane segment. The method comprises for each one of the at least one lane path applying, by the electronic device, a local scoring model onto the graph-structure. The local scoring model is for assigning additional costs to lane-path-departing edges of the series of vertices, thereby determining locally-increased costs of the lane-path-departing edges of the series of vertices. The lane-path-departing edges connecting the series of vertices with other vertices of the graph-structure excluding the series of vertices. The method comprises for each one of the at least one lane path determining, by the electronic device, a locally-adjusted penalty score for each vertex in the series of vertices. A given locally adjusted penalty score for a respective vertex is a lowest cumulative cost of edges connecting the respective vertex and the destination vertex. The method comprises for each one of the at least one lane path identifying, by the electronic device, a lane path score for the respective lane path. The lane path score for the respective lane path is the locally-adjusted penalty score of the current vertex in the series of vertices of the respective lane path. The lane path score is indicative of a cost for the SDC for following the lane segment of the respective lane path without performing the lane-changing manoeuvre.

In some embodiments of the method, the series of vertices of the respective lane path includes a first vertex and a second vertex. The first vertex and the second vertex are included sequentially after the current vertex in the series of vertices. The additional cost assigned to at least one-path-departing edge of the first given vertex is smaller than the additional cost assigned to at least one lane-path-departing edge of the second given vertex, the electronic device thereby increasing costs of early departures from the lane segment of the respective lane path than the costs of later departures from the lane segment of the respective lane path.

In some embodiments of the method, the at least one lane path is a first lane path and a second lane path, and the determining the lane path score comprises determining a first lane path score for the first lane path and a second lane path score for the second lane path. The method further comprises using, by the electronic device, the first lane path score and the second lane path score for selecting a target lane path amongst the first lane path and the second lane path, where the target lane path is associated with a lowest one amongst the first lane path score and the second lane path score. The method further comprises generating, by the electronic device, a trajectory for the SDC along the lane segment of the target lane path. The method further comprises controlling, by the electronic device, the operation of the SDC such that the SDC follows the trajectory along the lane segment of the target lane path.

In some embodiments of the method, the at least one lane path is a plurality of lane paths. The method further comprises ranking, by the electronic device, the plurality of lane paths based on the respective lane path scores such that a given lane path amongst the plurality of lane paths associated with a lowest lane path score amongst the respective lane path scores is ranked as a highest one amongst the plurality of lane paths.

In some embodiments of the method, the first set of criteria is indicative of that a given transition corresponding to the SDC keeping its lane is more desirable than an other given transition corresponding to the SDC performing a lane-changing manoeuvre.

In some embodiments of the method, the first set of criteria is indicative of that a given transition corresponding to the SDC performing a slow lane-changing manoeuvre is more desirable than an other given transition corresponding to the SDC performing a rapid lane-changing manoeuvre.

In some embodiments of the method, the applying the local scoring model onto the graph-structure comprises identifying, by the electronic device, which edges of the graph-structure correspond to lane-path-following edges of the series of vertices and which edges of the graph-structure correspond to lane-path-departing edges of the series of vertices.

In some embodiments of the method, a first lane path amongst the at least one lane path is associated with a first series of vertices and a second lane path amongst the at least one lane path is associated with a second series of vertices. The first and the second series of vertices comprise at least one common vertex from the graph-structure, and the lane-path-departing edges of the at least one common vertex from the first series of vertices for the first lane path are different from the lane-path-departing edges of the at least one common vertex from the second series of vertices for the second lane path.

In some embodiments of the method, the method further comprises determining, by the electronic device, lane path scores for lane paths acquired at respective different moments in time during operation of the SDC.

In a second broad aspect of the present technology, there is provided an electronic device for controlling operation of a Self-Driving Car (SDC). The SDC is associated with the electronic device. The electronic device has access to data representative of an origin location and a destination location. The electronic device is configured to determine a route-level navigation information for the SDC to travel from the origin location to the destination location. The route-level navigation information is indicative of at least one road that the SDC is to travel on from the origin location to the destination location, the at least one road is associated with traffic rules. The electronic device is configured to use the traffic rules for determining lane-level information. The lane-level information is indicative of presence of at least one lane on each of the at least one road. The electronic device is configured to use the lane-level information for generating a graph-structure. The graph-structure includes a plurality of vertices and a plurality of edges. A given vertex is associated with a respective potential location of the SDC on a given lane of a given road of the at least one road. The plurality of vertices includes an origin vertex associated with the origin location and a destination vertex associated with the destination location. A given edge connects a respective pair of vertices in the graph-structure. The given edge is indicative of a transition between the potential location associated with a first one of the respective pair of vertices and the potential location associated with the second one of the respective pair of vertices. The electronic device is configured to apply a global scoring model onto the graph-structure. The global scoring model is associated with a first set of criteria for assigning costs to respective edges. A given cost assigned to a respective edge being indicative of a desirability of the respective transition in accordance with the first set of criteria. The electronic device is configured to determine a global penalty score for each vertex in the graph-structure. A given global penalty score for a respective vertex is a lowest cumulative cost of edges connecting a respective vertex and the destination vertex. The given global penalty score is indicative of a lowest global cost for the SDC for travelling to the destination location if the SDC finds itself in the potential location of the respective vertex. The electronic device is configured to store the edges of the graph-structure in association with the respective costs and the vertices of the graph-structure in association with the respective global penalty scores. The electronic device is configured to, at a given moment in time during operation of the SDC when the SDC is located at a current location between the origin location and the destination location acquire at least one lane path for the current location. The at least one lane path is indicative of a respective lane segment extending from the current location without a lane-changing manoeuvre. The electronic device is configured to, for each one of the at least one lane path, identify a series of vertices from the graph-structure covered by the respective lane segment of a respective lane path. A given series of vertices (i) begins at a current vertex associated with a respective potential location that corresponds to the current location of the SDC, and (ii) ends at a respective end vertex associated with a respective potential location that corresponds to an end of the respective lane segment. The electronic device is configured to, for each one of the at least one lane path, apply a local scoring model onto the graph-structure. The local scoring model is for assigning additional costs to lane-path-departing edges of the series of vertices thereby determining locally-increased costs of the lane-path-departing edges of the series of vertices. The lane-path-departing edges connect the series of vertices with other vertices of the graph-structure excluding the series of vertices. The electronic device is configured to, for each one of the at least one lane path, determine a locally-adjusted penalty score for each vertex in the series of vertices. A given locally adjusted penalty score for a respective vertex is a lowest cumulative cost of edges connecting the respective vertex and the destination vertex. The electronic device is configured to, for each one of the at least one lane path, identify a lane path score for the respective lane path. The lane path score for the respective lane path is the locally-adjusted penalty score of the current vertex in the series of vertices of the respective lane path. The lane path score is indicative of a cost for the SDC for following the lane segment of the respective lane path without performing the lane-changing manoeuvre.

In some embodiments of the electronic device, the series of vertices of the respective lane path includes a first vertex and a second vertex. The first vertex and the second vertex are included sequentially after the current vertex in the series of vertices. The additional cost assigned to at least one-path-departing edge of the first given vertex is smaller than the additional cost assigned to at least one lane-path-departing edge of the second given vertex. Thereby the electronic device is configured to increase costs of early departures from the lane segment of the respective lane path than the costs of later departures from the lane segment of the respective lane path.

In some embodiments of the electronic device, the at least one lane path is a first lane path and a second lane path, and the electronic device configured to determine the lane path score comprises the electronic device being configured to determine a first lane path score for the first lane path and a second lane path score for the second lane path. The electronic device is further configured to use the first lane path score and the second lane path score for selecting a target lane path amongst the first lane path and the second lane path. The target lane path is associated with a lowest one amongst the first lane path score and the second lane path score. The electronic device is further configured to generate a trajectory for the SDC along the lane segment of the target lane path. The electronic device is further configured to control the operation of the SDC such that the SDC follows the trajectory along the lane segment of the target lane path.

In some embodiments of the electronic device, the at least one lane path is a plurality of lane paths and the electronic device is further configured to rank the plurality of lane paths based on the respective lane path scores such that a given lane path amongst the plurality of lane paths associated with a lowest lane path score amongst the respective lane path scores is ranked as a highest one amongst the plurality of lane paths.

In some embodiments of the electronic device, the first set of criteria is indicative of that a given transition corresponding to the SDC keeping its lane is more desirable than an other given transition corresponding to the SDC performing a lane-changing manoeuvre.

In some embodiments of the electronic device, the first set of criteria is indicative of that a given transition corresponding to the SDC performing a slow lane-changing manoeuvre is more desirable than an other given transition corresponding to the SDC performing a rapid lane-changing manoeuvre.

In some embodiments of the electronic device, the electronic device configured to apply the local scoring model onto the graph-structure comprises the electronic device configured to identify which edges of the graph-structure correspond to lane-path-following edges of the series of vertices and which edges of the graph-structure correspond to lane-path-departing edges of the series of vertices.

In some embodiments of the electronic device, a first lane path amongst the at least one lane path is associated with a first series of vertices and a second lane path amongst the at least one lane path is associated with a second series of vertices. The first and the second series of vertices comprise at least one common vertex from the graph-structure. The lane-path-departing edges of the at least one common vertex from the first series of vertices for the first lane path are different from the lane-path-departing edges of the at least one common vertex from the second series of vertices for the second lane path.

In some embodiments of the electronic device, the electronic device is further configured to determine lane path scores for lane paths acquired at respective different moments in time during operation of the SDC.

In a third broad aspect of the present technology, there is provided a method of controlling operation of a Self-Driving Car (SDC). The SDC is associated with an electronic device. The electronic device has access to data representative of an origin location and a destination location. The method is executable by the electronic device. The method comprises determining, by the electronic device, a route-level navigation information for the SDC to travel from the origin location to the destination location. The route-level navigation information is indicative of at least one road that the SDC is to travel on from the origin location to the destination location. The at least one road is associated with traffic rules. The method comprises using, by the electronic device, the traffic rules for determining lane-level information. the lane-level information is indicative of presence of at least one lane on each of the at least one road. The method comprises using, by the electronic device, the lane-level information for generating a graph-structure. The graph-structure includes a plurality of vertices and a plurality of edges. A given vertex is associated with a respective potential location of the SDC on a given lane of a given road of the at least one road. The plurality of vertices includes an origin vertex associated with the origin location and a destination vertex associated with the destination location. A given edge connects a respective pair of vertices in the graph-structure. The given edge is indicative of a transition between the potential location associated with a first one of the respective pair of vertices and the potential location associated with the second one of the respective pair of vertices. The method comprises applying, by the electronic device, a global scoring model onto the graph-structure. The global scoring model is associated with a first set of criteria for assigning costs to respective edges. A given cost assigned to a respective edge is indicative of a desirability of the respective transition in accordance with the first set of criteria. The method comprises storing, by the electronic device, the edges of the graph-structure in association with the respective costs. At a given moment in time during operation of the SDC when the SDC is located at a current location between the origin location and the destination location, the method comprises acquiring, by the electronic device, at least one lane path for the current location. The at least one lane path is indicative of a respective lane segment extending from the current location without a lane-changing manoeuvre. The method comprises, for each one of the at least one lane path identifying, by the electronic device, a series of vertices from the graph-structure covered by the respective lane segment of a respective lane path. A given series of vertices (i) begins at a current vertex associated with a respective potential location that corresponds to the current location of the SDC, and (ii) ends at a respective end vertex associated with a respective potential location that corresponds to an end of the respective lane segment. The method comprises, for each one of the at least one lane path, applying, by the electronic device, a local scoring model onto the graph-structure. The local scoring model is for assigning additional costs to lane-path-departing edges of the series of vertices, thereby determining locally-increased costs of the lane-path-departing edges of the series of vertices. The lane-path-departing edges connect the series of vertices with other vertices of the graph-structure excluding the series of vertices. The method comprises, for each one of the at least one lane path, determining, by the electronic device, a local penalty score for each vertex in the series of vertices based on the locally-increased costs of the lane-path-departing edges of the series of vertices. A given local penalty score for a respective vertex is a lowest cumulative cost of edges connecting the respective vertex and the destination vertex. The method comprises, for each one of the at least one lane path, identifying, by the electronic device, a lane path score for the respective lane path. The lane path score for the respective lane path is the local penalty score of the current vertex in the series of vertices of the respective lane path. The lane path score is indicative of a cost for the SDC for following the lane segment of the respective lane path without performing the lane-changing manoeuvre.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
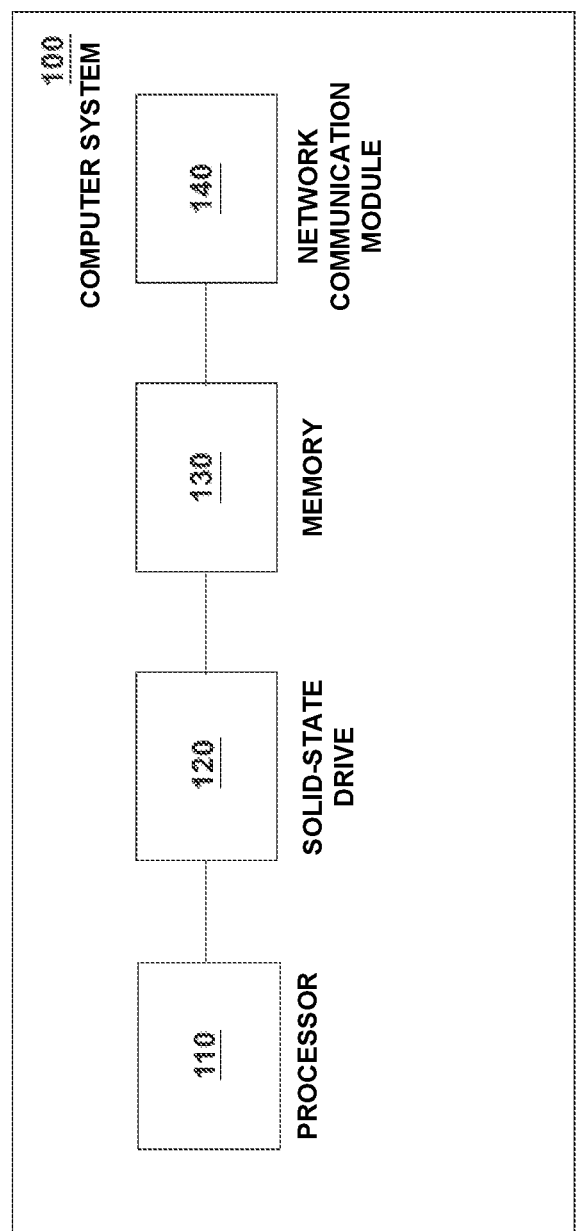
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology.

Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

In at least some embodiments of the present technology, the solid-state drive 120 stores program instructions suitable for being loaded into the memory 130 and executed by the processor 110 for determining a presence of an object. For example, the program instructions may be part of a vehicle control application executable by the processor 110.

In at least some embodiments of the present technology, it is contemplated that the computer system 100 may have additional and/or optional components, such as a network communication module 140 for communication, via a communication network (for example, a communication network 240 depicted in FIG. 2) with other electronic devices and/or servers, localization modules (not depicted), and the like.

Networked Computer Environment

Figure 2:
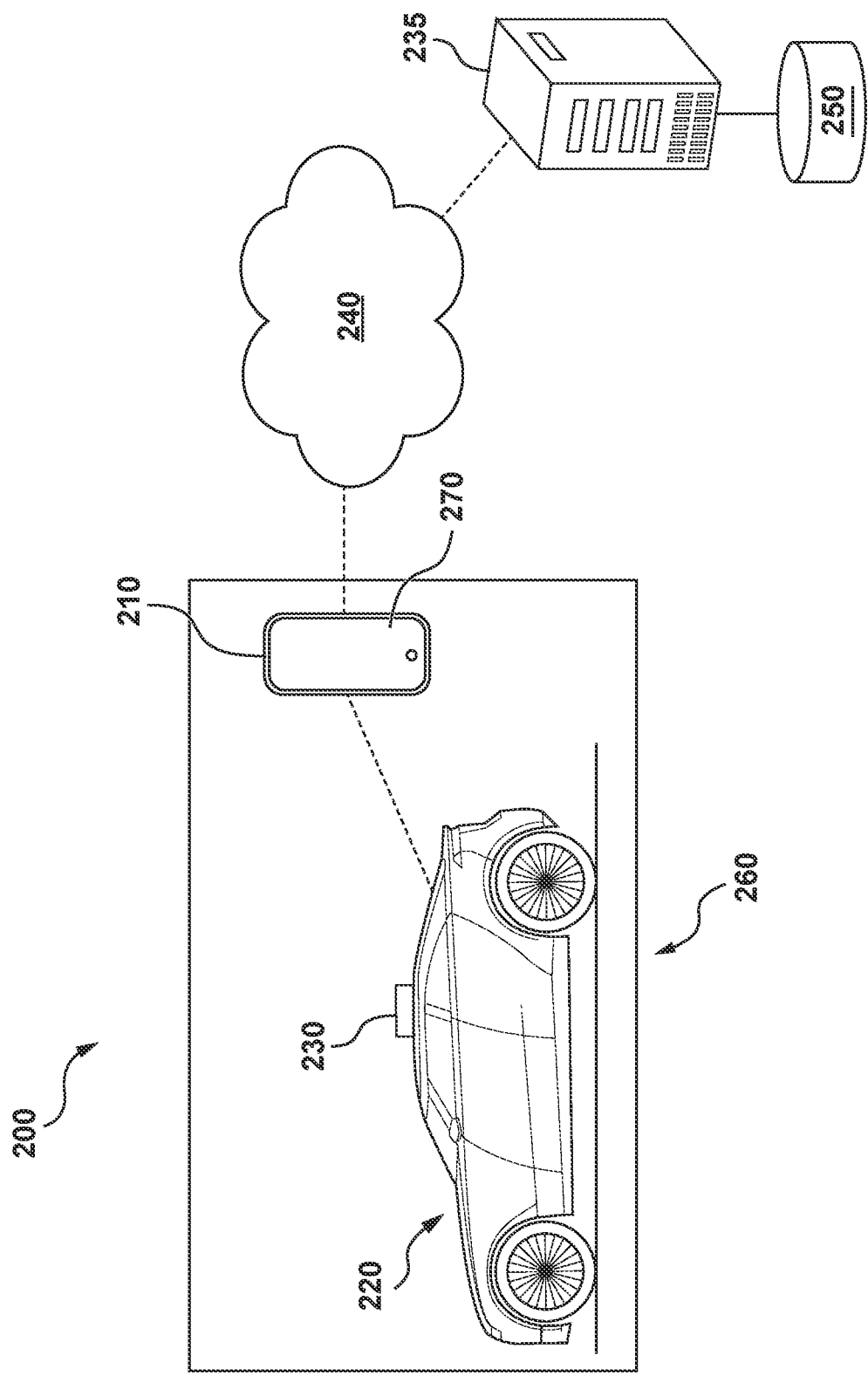
FIG. 2 depicts a networked computing environment suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via the communication network 240 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, with which the electronic device 210 is associated, may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, and a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for determining a trajectory of the vehicle 220 at a given road segment considering obstacles therein, as will be described in greater detail below.

Sensor System

In the non-limiting embodiments of the present technology, the electronic device 210 comprises or has access to a sensor system 230. According to these embodiments, the sensor system 230 may comprise a plurality of sensors allowing for various implementations of the present technology. Examples of the plurality of sensors include but are not limited to: cameras, LIDAR sensors, and RADAR sensors, etc. The sensor system 230 is operatively coupled to the processor 110 for transmitting the so-captured information to the processor 110 for processing thereof, as will be described in greater detail herein below.

The sensor system 230 can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the sensor system 230 can be mounted in a dedicated enclosure (not depicted) mounted on the top of the vehicle 220.

Further, the spatial placement of the sensor system 230 can be designed taking into account the specific technical configuration thereof, configuration of the enclosure, weather conditions of the area where the vehicle 220 is to be used (such as frequent rain, snow, and other elements) or the like.

In the non-limiting embodiments of the present technology, the sensor system 230 may comprise a sensor configured to capture an image of a surrounding area 260. In this regard the sensor system 230 may be a camera or a plurality thereof (not separately depicted).

How the camera is implemented is not particularly limited. For example, in one specific non-limiting embodiments of the present technology, the camera can be implemented as a mono camera with resolution sufficient to detect objects at pre-determined distances of up to about 30 m (although cameras with other resolutions and ranges are within the scope of the present disclosure).

In some embodiments of the present technology, the camera (or one or more cameras that make up the implementation of the sensor system 230) is configured to capture a pre-determined portion of the surrounding area 260 around the vehicle 220. In some embodiments of the present technology, the camera is configured to capture an image (or a series of images) that represent approximately 90 degrees of the surrounding area 260 around the vehicle 220 that are along a movement path of the vehicle 220.

In other embodiments of the present technology, the camera is configured to capture an image (or a series of images) that represent approximately 180 degrees of the surrounding area 260 around the vehicle 220 that are along a movement path of the vehicle 220. In yet additional embodiments of the present technology, the camera is configured to capture an image (or a series of images) that represent approximately 360 degrees of the surrounding area 260 around the vehicle 220 that are along a movement path of the vehicle 220 (in other words, the entirety of the surrounding area around the vehicle 220).

In a specific non-limiting example, the camera can be of the type available from FLIR Integrated Imaging Solutions Inc., 12051 Riverside Way, Richmond, BC, V6W 1K7, Canada. It should be expressly understood that the camera can be implemented in any other suitable equipment.

In the non-limiting embodiments of the present technology, the sensor system 230 may further comprise a LIDAR instrument (not separately depicted). Lidar stands for LIght Detection and Ranging. It is expected that a person skilled in the art will understand the functionality of the LIDAR instrument, but briefly speaking, a transmitter (not depicted) of the LIDAR sends out a laser pulse and the light particles (photons) are scattered back to a receiver (not depicted) of the LIDAR instrument. The photons that come back to the receiver are collected with a telescope and counted as a function of time. Using the speed of light (~3X108 m/s), the processor 110 can then calculate how far the photons have travelled (in the round trip). Photons can be scattered back off of many different entities surrounding the vehicle 220, such as other particles (aerosols or molecules) in the atmosphere, other cars, stationary objects or potential obstructions in front of the vehicle 220.

In a specific non-limiting example, the LIDAR instrument comprised in the sensor system 230 can be implemented as the LIDAR based sensor that may be of the type available from Velodyne LiDAR, Inc. of 5521 Hellyer Avenue, San Jose, Calif. 95138, United States of America. It should be expressly understood that the LIDAR instrument can be implemented in any other suitable equipment.

In some embodiments of the present technology, the LIDAR instrument comprised in the sensor system 230 can be implemented as a plurality of LIDAR based sensors, such as three, for example, or any other suitable number.

In the non-limiting embodiments of the present technology, the sensor system 230 may further comprise a RAdio Detection And Ranging (RADAR) instrument (not separately depicted). Briefly speaking, the RADAR instrument is a detection instrument using radio waves to determine a range, angle and/or velocity of objects. The RADAR instrument includes a transmitter producing electromagnetic waves, an antenna used for transmitting and receiving electromagnetic waves, a receiver, and a processor to determine properties of the detected objects.

In alternative embodiments of the present technology, there may be a separate antenna for receiving waves, and a separate antenna for transmitting waves. The processor used for determining properties of surrounding objects may be the processor 110.

In some embodiments of the present technology, the RADAR instrument used in the sensor system 230 may comprise long-range, medium-range and short-range RADAR sensors. As a non-limiting example, the long-range RADAR sensor may be used for adaptive cruise control, automatic emergency braking, and forward collision warning, while the medium and short-range RADAR sensors may be used for park assist, cross-traffic alert, junction assist, and blind side detection.

In a specific non-limiting example, the RADAR instrument comprised in the sensor system 230 may be of the type available from Robert Bosch GmbH of Robert-Bosch-Platz 1, 70839 Gerlingen, Germany. It should be expressly understood that the RADAR instrument can be implemented in any other suitable equipment.

In some non-limiting embodiments of the present technology, the sensor system 230 may be used, by the processor 110, for image calibration. For example, using an image captured by the camera and the LIDAR point cloud captured by the LIDAR instrument, the processor 110 is configured to identify a given region of the image to correspond to a given region of the LIDAR point cloud captured by the LIDAR instrument. In other embodiments of the present technology, the sensor system 230 are calibrated such that for the image captured by the camera, the LIDAR point cloud captured by the LIDAR instrument, and the RADAR data captured by the RADAR instrument, the processor 110 is configured to identify a given region of the image to correspond to a given region of the LIDAR point cloud and the RADAR data.

In the non-limiting embodiments of the present technology, the vehicle 220 further comprises or has access to other sensors (not separately depicted). The other sensors include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the vehicle 220.

As a non-limiting example, the IMU may be fixed to the vehicle 220 and comprise three gyroscopes and three accelerometers for providing data on the rotational motion and linear motion of the vehicle 220, which may be used to calculate motion and position of the vehicle 220.

Communication Network

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations of the communication network 240 are for illustration purposes only. How a communication link (not separately numbered) between the electronic device 210 and the communication network 240 is implemented will depend inter alia on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with a server 235.

Server

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like.

In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

Storage

In FIG. 2, there is also depicted a storage 250 communicatively coupled to the server 235. In some embodiments, however, the storage 250 may be communicatively coupled to the electronic device 210 and/or may be implemented within the electronic device 210 and/or may be communicatively coupled to any other processor of the networked computer environment 200.

In at least some embodiments, it is contemplated that the storage 250 may be used by the server 235, the electronic device 210 and/or any other processor of the networked computer environment 200 as a memory device for storing information. The storage 250 is configured to store information extracted, determined and/or generated by the processor 110 of the server 235 and/or the electronic device 210. Generally speaking, the storage 250 may receive data from the processor 110 which was generated by the processor 110 during processing for temporary and/or permanent storage thereof and may provide stored data to the processor 110 for use thereof. It is contemplated that the storage 250 may be split into several distributed storages, for providing a fault-tolerant storage system for example, without departing from the scope of the present technology.

It should be noted that in at least some embodiments of the present technology, the storage 250 may be implemented locally on the electronic device 210 and/or the server 235 (such as on a local memory, for example). It is also contemplated however that the storage 250 may be implemented remotely from the electronic device 210 and/or the server 235 (such as on a remote memory, for example).

Electronic Device

Broadly speaking, the electronic device 210 is configured to control operation of the vehicle 220. For example, the electronic device 210 may have access to (i) data representative of a given origin location, and (ii) data representative of a given destination location, and the electronic device 210 may be configured to generate data for controlling operation of the vehicle 220 such that the vehicle 220 travels from the given origin location to the given destination location.

Therefore, in at least some embodiments of the present technology, the electronic device 210 may be configured to determine and/or acquire "route-level navigation information" for the vehicle 220, so that the vehicle 220 is able to travel from the given origin location to the given destination location. Broadly speaking, this route-level navigation information is indicative of at least one road (and/or segment(s) thereof) that the vehicle 220 is to travel on in order to travel from the given origin location to the given destination location.

Figure 3:
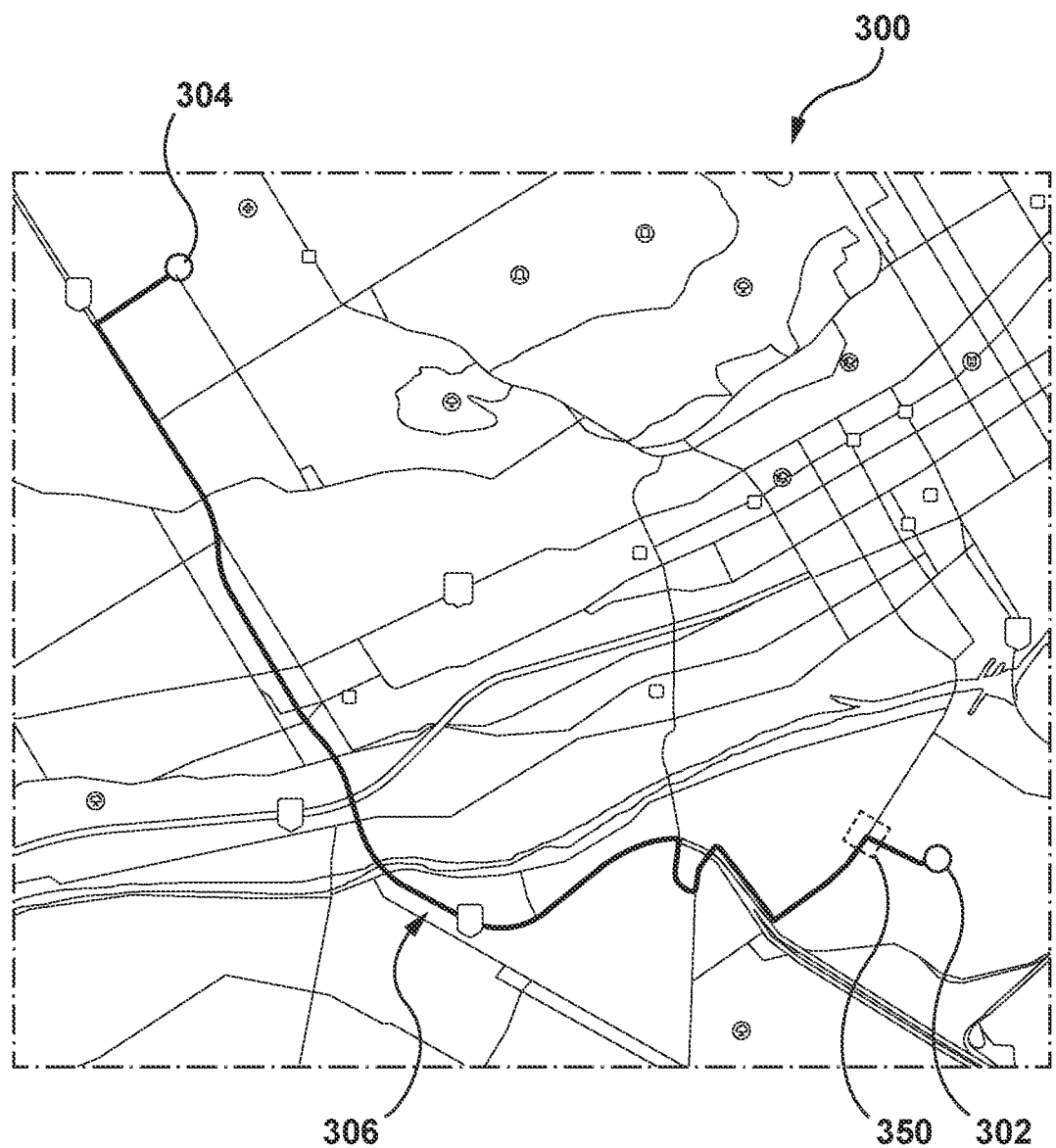
FIG. 3 depicts a representation of route-level navigation information that the electronic device of FIG. 2 may be configured to determine and/or acquire, in accordance with some embodiments of the present technology.

To better illustrate this, reference will now be made to FIG. 3 depicting a representation 300 of route-level navigation information that the electronic device 210 may be configured to determine and/or acquire from an external device (e.g., the server 235). As seen, there is depicted an origin location 302 indicative of a "starting point" for the vehicle 220. In some cases, the origin location 302 of the vehicle 220 may correspond to a current location of the vehicle 220. There is also depicted a destination location 304 indicative of an "ending point" for the vehicle 220.

In addition, the route-level navigation information may include data representative of a route 306 for travelling from the origin location 302 to the destination location 304. In some cases, the route-level navigation information may include data representative of more than one routes for travelling from the origin location 302 to the destination location 304, such as a set of alternative routes, for example. In such cases, the route 306 may be a most time-efficient route, for example, amongst the more than one routes for travelling from the origin location 302 to the destination location 304.

It should be noted that the present description of data processing by the electronic device 210 will be provided for the route 306, however, it is contemplated that the electronic device 210 may be configured to perform data processing for other ones from the more than one routes in a similar manner to how the electronic device is configured to perform data processing for the route 306, without departing from the scope of the present technology.

Returning to the description of FIG. 3, the route 306 includes a number of roads and/or segments thereof that the vehicle 220 may need to travel on for travelling from the origin location 302 to the destination location 304. It should be noted that the electronic device 210 may be configured to determine and/or acquire, in addition to the route 306, traffic rules associated with the at least one road of the route 306. It is contemplated that in some embodiments, the electronic device 210 may be configured to acquire data representative of the route 306 and/or data representative of traffic rules from the server 235 and/or local and/or remote storage devices.

In at least some embodiments of the present technology, the electronic device 210 may be configured to use the traffic rules associated with the at least one road of the route 306 for determining "lane-level information" for the route 306. Broadly speaking, the lane-level information is indicative of the presence of at least one lane on at least some of the at least one road of the route 306. For example, the lane-level information may be indicative of inter alia a number of lanes on roads (and/or segments thereof) associated with the route 306.

Thus, it can be said that the route-level navigation information may be representative of data about the route 306 at a "higher" level of detail for identifying roads on which the vehicle 220 will be travelling while following the route 306, whereas lane-level information may be representative of data about the route 306 on a "lower" level of detail for identifying inter alia lanes on each one of those roads and which the vehicle 220 may potentially take while following the route 306.

Figure 4:
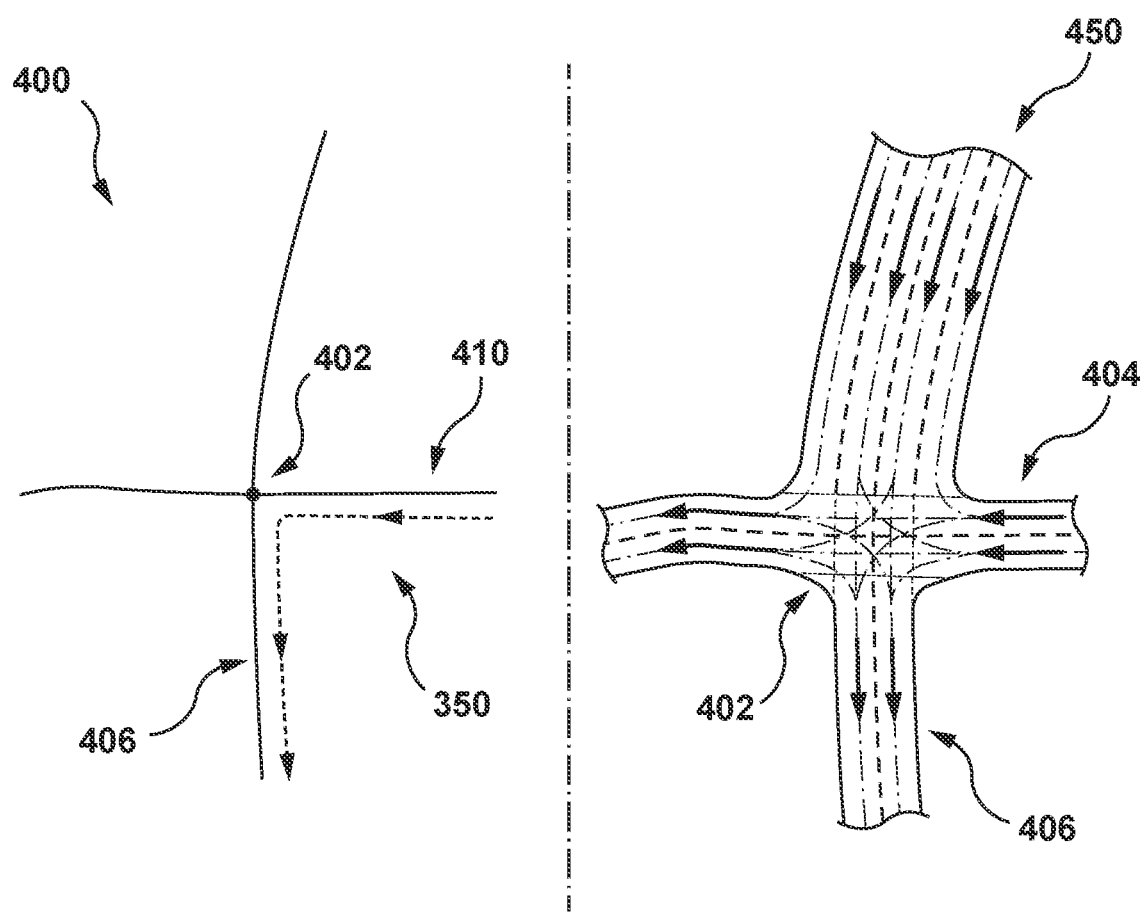
FIG. 4 depicts a representation of lane-level information that the electronic device of FIG. 2 may be configured to determine based on traffic rules associated with the route-level navigation information, in accordance with some embodiments of the present technology.

To better illustrate this, let's consider a route portion 350 of the route 306. In FIG. 4, there is depicted a zoomed representation 400 of the route portion 350. As it can be seen, the route portion 350 of the route 306 is indicative of that the vehicle 220 is to travel on a road portion 410 towards an intersection 402, and that at the intersection 402 the vehicle 220 is to turn left and continue travelling on a road portion 406. Thus, it can be said that this information is part of the route-level navigation information for the vehicle 220.

There is also depicted a representation 450 of the lane-level information that the electronic device 210 may be configured to determine based on the traffic rules associated with the road portion 410, the intersection 402 and the road portion 406. For example, the electronic device 210 may determine (i) presence of two lanes on the road portion 410, (ii) which one(s) of the two lanes allow a left-turn at the intersection 402, (iii) presence of two lanes on the road portion 406, and (iv) so forth. The electronic device 210 may determine this information as part of the lane-level information for the route portion 350 of the route 306.

Figure 5:
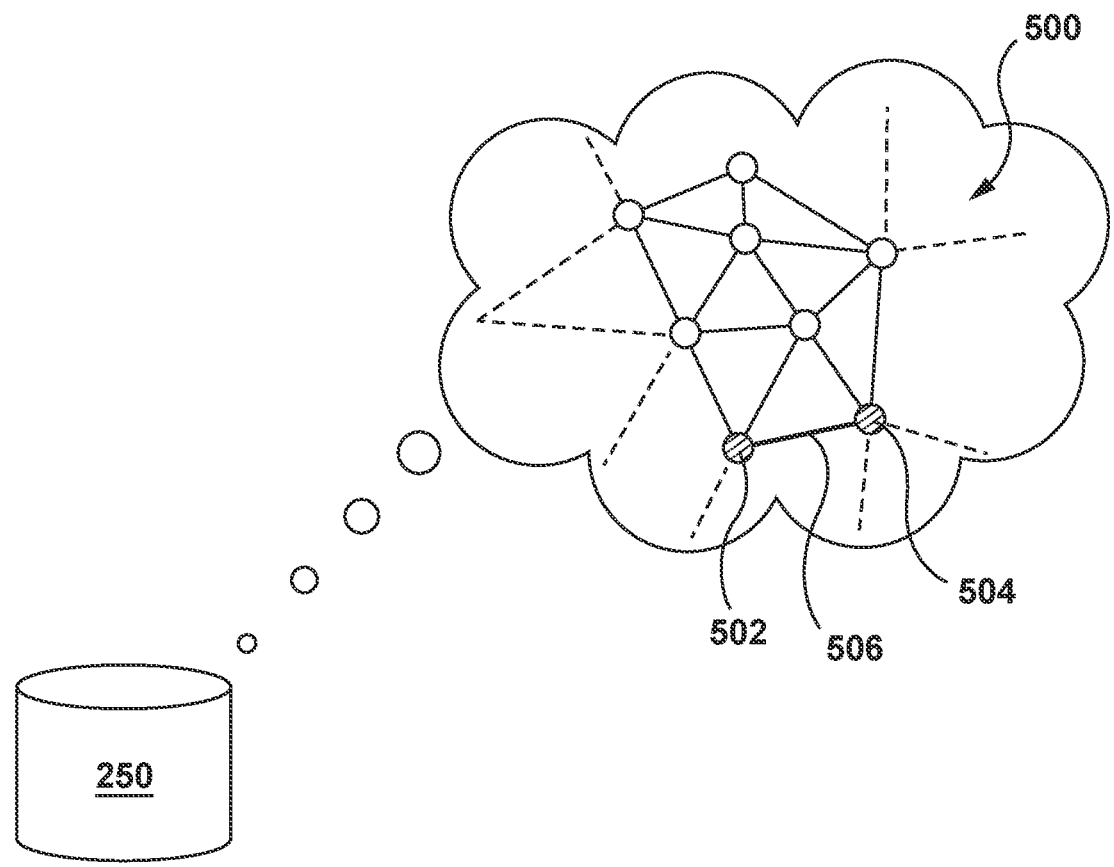
FIG. 5 depicts a graph-structure that the electronic device of FIG. 2 may be configured to generate and store, in accordance with some embodiments of the present technology.

In some embodiments of the present technology, the electronic device 210 may be configured to use the lane-level information about the route 306 for generating a given "graph-structure". With reference to FIG. 5, there is depicted a data representative of a graph-structure 500 that the electronic device 210 may be configured to generate and store in the storage 250 (and/or a local storage). Broadly speaking, the graph-structure 500 includes a plurality of vertices (not numbered) and a plurality of edges (not numbered) connecting respective pairs of vertices from the plurality of vertices. For example, an edge 506 from the plurality of edges connects a pair of vertices from the plurality of vertices, and where the pair of vertices includes a first vertex 502 and a second vertex 504.

It should be noted that a given vertex is associated with a respective potential location of the vehicle 220 on a given lane of a given road of the at least one road of the route 306. For example, the first vertex 502 is associated with a first given potential location of the vehicle 220 on a given lane of a given road of the route 306, and the second vertex 504 is associated with a second given potential location of the vehicle 220 on the given lane of the given road on the route 306.

It should also be noted that a given edge is indicative of a transition between the potential locations of the respective pair of vertices that it connects. In the same example, the edge 506 is indicative of a transition between (i) the first given potential location associated with the first vertex 502, and (ii) the second given potential location associated with the second vertex 504.

It should further be noted that the plurality of vertices of the graph-structure 500 also includes a given origin vertex associated with the origin location 302 (of the route 306) and a given destination vertex associated with the destination location 304 (of the route 306). Therefore, it can be said that the graph-structure 500 may include data indicative of:
  a number of potential locations (i) between the origin location 302 and the destination location 304 along the route 306, and (ii) at which the vehicle 220 may find itself while travelling along the route 306 and while being able to use different lanes of the respective roads of the route 306 to do so; and
  a number of potential transitions between respective pairs of potential locations that the vehicle 220 may need to perform in order to travel from (i) a first potential location from the respective pair of potential locations to (ii) a second potential location from the respective pair of potential locations.

Figure 6:
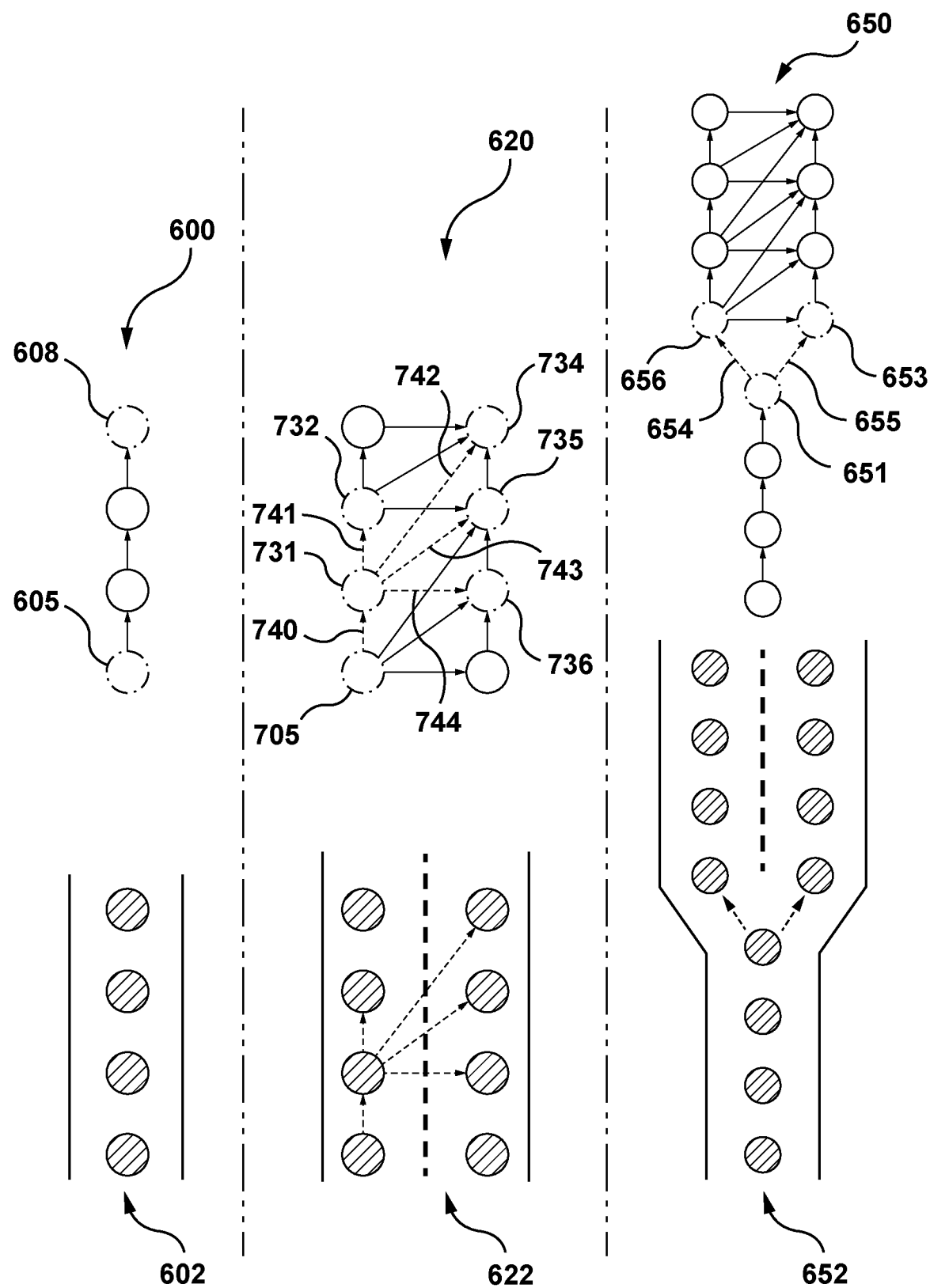
FIG. 6 depicts three simplified graph-structure representation the electronic device of FIG. 2 may be configured to generate, in accordance with some embodiments of the present technology.

To better illustrate this, reference will now be made to FIG. 6 that depicts three simplified graph-structure representations, namely a first simplified graph-structure 600, a second simplified graph-structure 620, and a third simplified graph-structure 650. As it will become apparent from the description herein, the graph-structure 500 may include a very large number of vertices and edges, and that the first, the second, and the third simplified graph-structures 600, 620 and 650 have been depicted as having only a few vertices and edges solely for the sake of simplicity.

In a first example, the first simplified graph-structure 600 has an origin vertex 605 and a destination vertex 608, and two intermediate vertices (not numbered). It can also be seen that the first simplified graph-structure 600 includes three edges (not numbered), each connecting a respective pair of vertices. In this first example, the four vertices of the first simplified graph-structure 600 correspond to four potential locations (not numbered) of the vehicle 220 along a first given road 602, and which are depicted as dots on the first given road 602. As such, a respective edge between a respective pair of vertices in the first simplified graph-structure 600 is indicative of a transition between a respective pair of potential locations in which the vehicle 220 may find itself on the first given road 602.

In a second example, the second simplified graph-structure 620 has an origin vertex 705 and a destination vertex 734, and six intermediary vertices. Amongst the six intermediary vertices, there is a vertex 731, a vertex 732, a vertex 735, and a vertex 736. It can also be seen that that second simplified graph-structure 620 has a number of edges connecting respective pairs of vertices.

In this second example, the eight vertices of the second simplified graph-structure 620 correspond to eight potential locations (not numbered) of the vehicle 220 along a second given road 622 having two lanes, and which are depicted as dots on the second given road 622.

For example, the vertex 731 is connected with (i) the origin vertex 705, (ii) the vertex 732, (iii) the destination vertex 734, (iv) the vertex 735, and (v) the vertex 736 via respective edges. In this example:

- an edge 740 is indicative of a transition (i) from the origin location of the origin vertex 705 to (ii) the potential location of vehicle 220 on the second given road 622 associated with the vertex 731;
- an edge 741 is indicative of a transition from (i) the potential location of vehicle 220 on the second given road 622 associated with the vertex 731 to (ii) the potential location of vehicle 220 on the second given road 622 associated with the vertex 732;
- an edge 742 is indicative of a transition from (i) the potential location of vehicle 220 on the second given road 622 associated with the vertex 731 to (ii) the destination location of vehicle 220 on the second given road 622 associated with the destination vertex 734;
- an edge 743 is indicative of a transition from (i) the potential location of vehicle 220 on the second given road 622 associated with the vertex 731 to (ii) the potential location of vehicle 220 on the second given road 622 associated with the vertex 735; and
- an edge 744 is indicative of a transition from (i) the potential location of vehicle 220 on the second given road 622 associated with the vertex 731 to (ii) the potential location of vehicle 220 on the second given road 622 associated with the vertex 736.

It can be said that the edge 740 is indicative of a transition in which the vehicle 220 is at the origin location of the origin vertex 705 and continues in the corresponding lane of the given road 622 for arriving at the potential location of the vertex 731 also located in the corresponding lane of the given road 622.

It can be said that the edge 741 is indicative of a transition in which the vehicle 220 is at the potential location of the vertex 731 and continues in the corresponding lane of the given road 622 for arriving at the potential location of the vertex 732 also located in the corresponding lane of the given road 622.

It can be said that the edge 744 is indicative of a transition in which the vehicle 220 is at the potential location of the vertex 731 and performs a "rapid" lane-changing manoeuvre for arriving at the potential location of the vertex 736 in the neighbouring lane of the given road 622.

It can be said that the edge 742 is indicative of a transition in which the vehicle 220 is at the potential location of the vertex 731 and performs a "slow" lane-changing manoeuvre for arriving at the destination location of the destination vertex 734 in the neighbouring lane of the given road 622.

It can be said that the edge 743 is indicative of a transition in which the vehicle 220 is at the potential location of the vertex 731 and performs a lane-changing manoeuvre (that is "less rapid" than the one of the edge 744, and "more rapid" than the one of the edge 742) for arriving at the potential location of the vertex 735 in the neighbouring lane of the given road 622.

It should be noted that in some embodiments of the present technology, a pair of vertices may be connected by more than one respective edges. For example, a pair of vertices may be connected by two edges—one may be indicative of a transition from the first one in the pair of vertices to the second one in the pair of vertices, while the other one may be indicative of a transition from the second one in the pair of vertices to the first one in the pair of vertices. Thus, it can be said that a given edge in a given graph-structure may be also indicative of a "directionality" of the corresponding transition between the pair of vertices.

In a third example, the third simplified graph-structure 650 has twelve vertices, including an origin vertex (not numbered) and a destination vertex (not numbered). It can also be seen that the third simplified graph-structure 650 includes many edges (not numbered), each connecting a respective pair of vertices amongst the twelve vertices of the third simplified graph-structure 650.

In this third example, the twelve vertices of the third simplified graph-structure 650 correspond to twelve potential locations (not numbered) of the vehicle 220 along a third given road 652 having a single lane that splits into two separate lanes. As such, a respective edge between a respective pair of vertices in the third simplified graph-structure 650 is indicative of a transition between a respective pair of potential locations in which the vehicle 220 may find itself on the third given road 652.

It should be noted that in this third example, a vertex 651 is connected (i) with a vertex 656 by an edge 654, and (ii) with a vertex 653 by an edge 655. It can be said that the edge 654 is indicative of a transition in which the vehicle 220 is at the potential location of the vertex 651 (in a single lane portion of the third given road 652) and proceeds to the potential location of the vertex 656 (in a left lane of the third given road 652) without performing a lane-changing manoeuvre. Indeed, the transition of the edge 654 does not correspond to a transition requiring a lane-changing manoeuvre as the vehicle 220 would not switch between different lanes of the third given road 652 if the vehicle 220 is to undertake the transition of the edge 654. Similarly, it can be said that the edge 655 is indicative of a transition in which the vehicle 220 is at the potential location of the vertex 651 (in the single lane portion of the third given road 652) and proceeds to the potential location of the vertex 653 in a right lane of the third given road 652 without performing a lane-changing manoeuvre.

To summarize, the electronic device 210 may be configured to use the lane-level information (about the route 306) for generating the graph-structure 500 depicted in FIG. 5. The graph-structure 500 includes (i) the plurality of vertices (associated with respective potential locations on various lanes of various roads of the route 306), and (ii) the plurality of edges each of which is indicative of a respective transition between the potential locations of the corresponding pair of vertices that it connects.

Some of the edges may be indicative of transitions that do not a require lane-changing manoeuvres (staying in the same lane), while other edges may be indicative of transitions that do require lane-changing manoeuvres. Also, some edges may be indicative of rapid lane-changing manoeuvres, while other edges may be indicative of slow lane-changing manoeuvres, and while further edges may be indicative of lane-changing manoeuvres that are "in between" rapid and slow lane-changing manoeuvres.

Global Scoring Model

Developers of the present technology have realized that some transitions between respective pairs of potential locations are less "desirable" than others. For example, a transition corresponding to a rapid lane-changing manoeuvre may be less desirable than a transition corresponding to a slow lane-changing manoeuvre—that is, performing a rapid lane-changing manoeuvre is more dangerous if compared against a slow lane-changing manoeuvre. In another example, a transition corresponding to a lane-changing manoeuvre where the traffic rules allow it is more desirable than a transition corresponding to a lane-changing manoeuvre where the traffic rules do not allow it (e.g., where the respective pair of lanes is divided by a non-interrupted traffic line)—that is, performing a manoeuvre that is not allowed by traffic rules is not only dangerous, but is also illegal. In a further example, a transition corresponding to a lane-changing manoeuvre may be less desirable than a transition corresponding to the vehicle 220 keeping its lane—that is, for reducing the risk of collision and for other safety purposes during operation, it is generally desirable to reduce a number of lane-changing manoeuvres (even if they are allowed by traffic rules) performed by the vehicle 220.

For that reason, the electronic device 210 may be configured to apply a "global scoring model" onto the graph-structure 500. Broadly speaking, the global scoring model refers to a model that allows assigning different "costs" to respective edges of the graph-structure 500, and which costs are indicative of a desirability of the respective transition. These costs are assigned, by the electronic device 210 employing the global scoring model, to respective edges in accordance with a first set of criteria that is selected for evaluating desirability of potential transitions, and/or how desirability of different transitions compare to each other. Therefore, it can be said that the electronic device 210 may be configured to apply this global scoring model, which is associated the set of first criteria, onto the graph-structure 500 for assigning costs to respective edges thereof.

Also, as it will become apparent from the description herein further below, the electronic device may be configured to use these costs (assigned to edges of the graph-structure 500) for determining "global penalty scores" for respective vertices of the graph-structure 500. How the electronic device 210 is configured to assign costs to edges, how the costs are used by the electronic device 210 for determining global penalty scores for respective vertices, and what these global penalty scores are indicative of, will now be described with reference to both FIG. 6 and FIG. 7.

Figure 7:
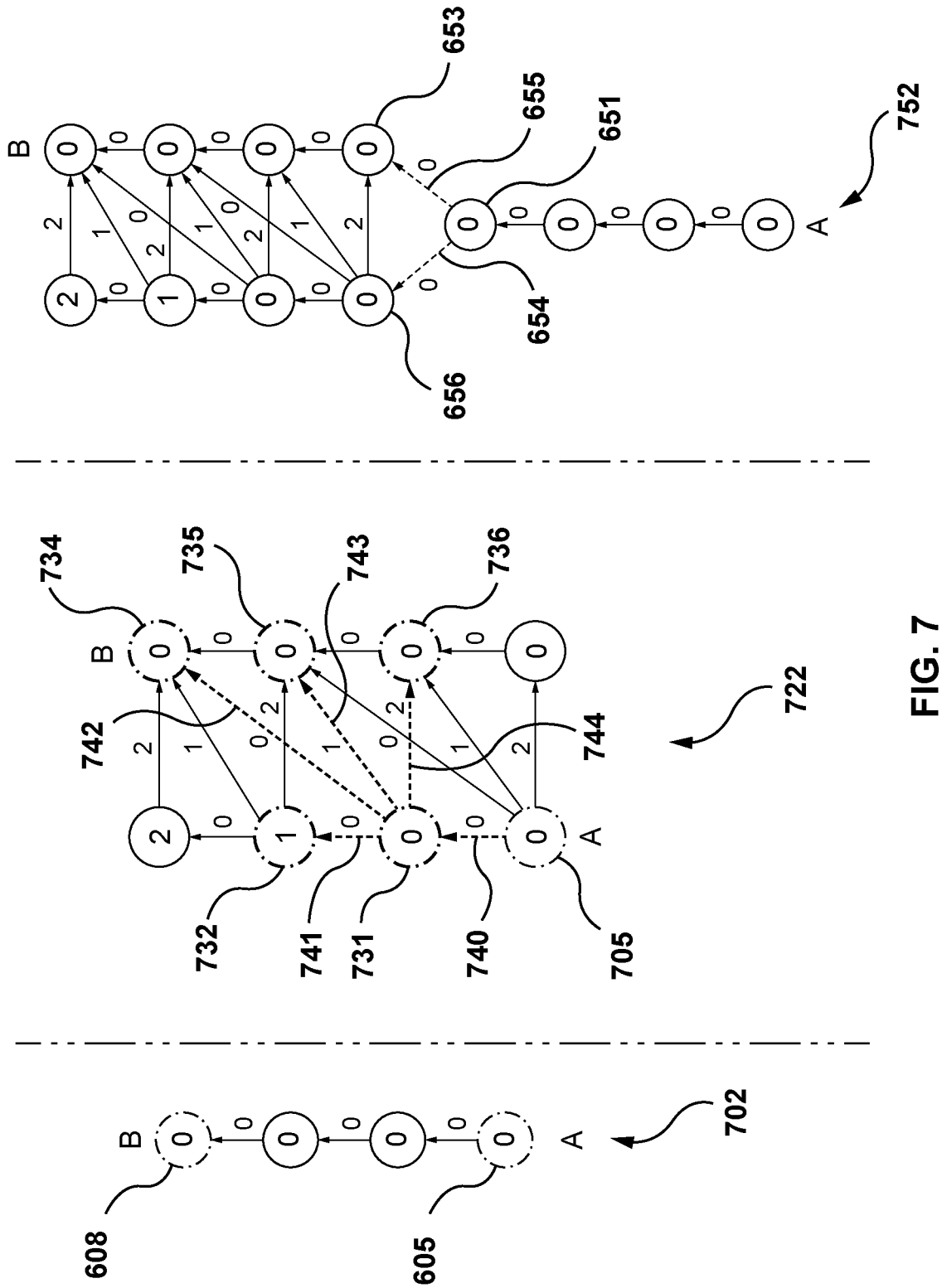
FIG. 7 depicts the three simplified graph-structure representation of FIG. 6 with global penalty scores associated with the respective vertices, in accordance with some embodiments of the present technology.

In FIG. 7, there is depicted a first representation 702 of the first simplified graph-structure 600 (see FIG. 6) with (i) costs assigned to respective edges and (ii) global penalty scores determined for respective vertices. There is also depicted a second representation 722 of the second simplified graph-structure 620 with (i) costs assigned to respective edges and (ii) global penalty scores determined for respective vertices. There is also depicted a third representation 752 of the third simplified graph-structure 650 with (i) costs assigned to respective edges and (ii) global penalty scores determined for respective vertices.

To better illustrate how the costs are assigned to respective edges of a given graph-structure, reference will now be made to the vertex 731 of the second representation 722 and its respective edges. As previously alluded to, four edges represent transitions from the vertex 731 to respective other vertices, namely:

the edge 741 is indicative of a transition from (i) the potential location of the vertex 731 to (ii) the potential location of the vertex 732 (e.g., corresponding to the vehicle 220 keeping its lane);

the edge 742 is indicative of a transition from (i) the potential location of the vertex 731 to (ii) the destination location of the destination vertex 734 (e.g., corresponding to the vehicle 220 performing a slow lane-changing manoeuvre);

the edge 743 is indicative of a transition from (i) the potential location of the vertex 731 to (ii) the potential location of the vertex 735 (e.g., corresponding to the vehicle 220 performing a spirited (not slow but not rapid) lane-changing manoeuvre); and the edge 744 is indicative of a transition from (i) the potential location of the vertex 731 to (ii) the potential location of the vertex 736 (e.g., corresponding to the vehicle 220 performing a rapid lane-changing manoeuvre).

In this example, when the electronic device 210 applies the global scoring model onto the second simplified graph-structure 620, the electronic device 210 may be configured to use the first set of criteria for assigning (i) a cost of "2" to the edge 744, (ii) a cost of "1" to the edge 743, (iii) a cost of "0" for to edge 742, and (iv) a cost of "0" to the edge 741. The assigned costs are indicative of the desirability of respective transitions in accordance with the first set of criteria associated with the first scoring model. Indeed, as mentioned above, it is less desirable of performing the rapid lane-changing manoeuvre of the edge 744 than the spirited lane-changing manoeuvre of the edge 743. Also, it is less desirable of performing the spirited lane-changing manoeuvre of the edge 743 than the slow lane-changing manoeuvre of the edge 742. Also, it could be said that the vehicle 220 keeping its lane may be as desirable as performing the slow lane-changing manoeuvre, and so both the edge 742 and 741 may have the same cost associated therewith.

It should be noted that the first set of criteria may include a variety of criteria that may vary based on a specific implementation of the present technology. However, irrespective of the specific criteria included in the first set of criteria, the first set of criteria includes criteria that may allow evaluating the desirability (safety, smoothness, legality, and the like) of different transitions, and/or allow differentiating between the desirability associated with different transitions, without departing from the scope of the present technology.

The electronic device 210 may be configured to so-assign costs to (i) each edge of the second simplified graph-structure 620, (ii) each edge of the first simplified graph-structure 600 (see the costs on the first representation 702 illustrated on FIG. 7), and (iii) each edge of the third simplified graph-structure 650 (see the costs on the third representation 752 illustrated on FIG. 7) in a similar manner to what has been described above. However it should be noted that, for the edges 654 and 655 of the third simplified graph-structure 650, the electronic device 210 may be configured to assign a cost of "0" to both edges 654 and 655 as they are indicative of transitions that do not require a lane-changing manoeuvre, as previously alluded to, since the vehicle 220 can transition from the potential location of the vertex 651 to either one of the potential locations of the vertex 656 and 653 without performing lane-changing manoeuvres.

In some embodiments of the present technology, once the electronic device 210 assigns costs to respective edges of a given graph-structure, the electronic device 210 may be configured to determine global penalty scores for respective vertices of the given graph-structure. It should be noted that a given global penalty score of a given vertex in the given graph-structure represents a value corresponding to a lowest cumulative cost of edges connecting the given vertex to the respective destination vertex of the given graph-structure. It is contemplated that in some embodiments, the determination of these global penalty scores may be performed by the electronic device 210 making use of dynamic programming method(s).

Let's consider the example of the first representation 702 depicted in FIG. 7. Once the costs are assigned to the edges, the electronic device 210 may begin by determining the global penalty score of the destination vertex 608. It can be said that the electronic device 210 may be determining the global penalty scores in a "backward" (or back-propagation) manner—that is, starting from the global penalty score of the destination vertex 608, proceeding to immediately adjacent vertices, and so forth, until a global penalty score of the origin vertex 605 is determined.

As such, the electronic device 210 may determine that the destination vertex 608 is to be associated with a global penalty score of "0" since the current vertex for which the electronic device 210 is determining the global penalty score is in fact the destination vertex 608. It is contemplated that in some cases, the electronic device 210 may assign by default a global penalty score of "0" to the destination vertex 608. Then, the electronic device 210 may continue to determine global penalty scores for immediately adjacent vertices of the first simplified graph-structure 600, and so forth, until the global penalty score of the origin vertex 605 is determined. As such, in this example, the electronic device 210 may determine that the origin vertex 605 is to be associated with a global penalty score of "0", since the cumulative cost of edges connecting the destination vertex 608 with the origin vertex 605 is "0".

Now let's consider the example of the second representation 722 depicted in FIG. 7. Similarly to the previous example, once the costs are assigned to the edges, the electronic device 210 may start by determining the global penalty scores in a backward manner, starting from the global penalty score of the destination vertex 734, and ending with the global penalty score of the origin vertex 705. Again, for the same reason as in the previous example, the electronic device 210 may determine (and/or assign by default) that the destination vertex 734 is to be associated with a global penalty score of "0".

However, in this second example, let's consider how the electronic device 210 determines the global penalty score for the vertex 731. It should be noted that there are different sequences of edges that connect the vertex 731 to the destination vertex 734. For example:
the sequence of edges connecting the vertices 731, 736, 735, and 734, has a cumulative cost of edges of "2";
sequence of edges connecting vertices 731, 735, and 734, has a cumulative cost of edges of "1"; and
so forth.

In this example, the second simplified graph-structure 620 also has the edge 742 that directly connects the vertex 731 to the destination vertex 734 and has a cost of "0". As such, the cumulative cost of edge(s) connecting the vertex 731 with the destination vertex 734 for this sequence of edges (albeit having only one edge) is "0". As a result, the lowest cumulative cost of edges connecting the vertex 731 with the destination vertex 734 is "0".

Therefore, it can be said that when determining a global penalty cost for a given vertex, the electronic device 210 may be configured to compare cumulative costs of a number of different sequences of edges connecting the given vertex to the destination vertex 734 and may be configured to select the lowest one amongst the respective cumulative costs. As such, during determination of the global penalty score for the given vertex, the electronic device 210 may be configured to "recursively" determine cumulative costs for sequences of vertices connecting the given vertex with the destination vertex, and may select the lowest one thereof as the respective global penalty score.

It should also be noted that the global penalty score of "0" for the vertex 731 is indicative of a lowest global cost for the vehicle 220 for travelling to the destination location associated with the destination vertex 734 if the vehicle 220 finds itself and the potential location associated with the vertex 731. Put another way, the electronic device 210 may determine that the lowest global cost for the vehicle 220 for travelling from the potential location of the vertex 731 to the destination location of the destination vertex 734 will be associated with the vehicle 220 performing a slow lane-changing manoeuvre.

It can also be said that in this case, the electronic device 210 may be configured to determine that performing a rapid lane-changing manoeuvre and then keeping the neighbouring lane until the destination location is reached (i.e., transition corresponding to the sequence of edges connecting the vertices 731, 736, 735, and 734, having a cumulative cost of edges of "2") is less globally desirable than performing the slow lane-changing manoeuvre (e.g., transition corresponding to the edge 742).

Therefore, in summary, it can be said that the electronic device 210 may be configured to determine global penalty scores for the vertices of the graph-structure 500 in a "backward" and "recursive" manner, such that (i) the determination begins with a given destination vertex and continues backwardly towards the given origin vertex, and (ii) the global penalty score for a given vertex is determined by selecting a lowest cumulative cost amongst recursively determined cumulative costs of different sequences of edges connecting the given vertex to the given destination vertex. As mentioned above, it is contemplated that the electronic device 210 may be configured to employ dynamic programming method(s) for so-determining the global penalty scores of vertices in a given graph-structure.

It should be noted that the electronic device 210 may be configured to determine the global penalty scores for vertices of the third simplified graph-structure 752 (see FIG. 7) in a similar manner to how the electronic device 210 determines the global penalty scores of vertices of the first simplified graph-structure 600 and the second simplified graph-structure 620.

In some embodiments of the present technology, the electronic device 210 may be configured to store a given graph-structure in association with (i) costs of respective edges and (ii) global penalty scores of respective vertices in the storage 250 and/or a local storage.

Figure 8:
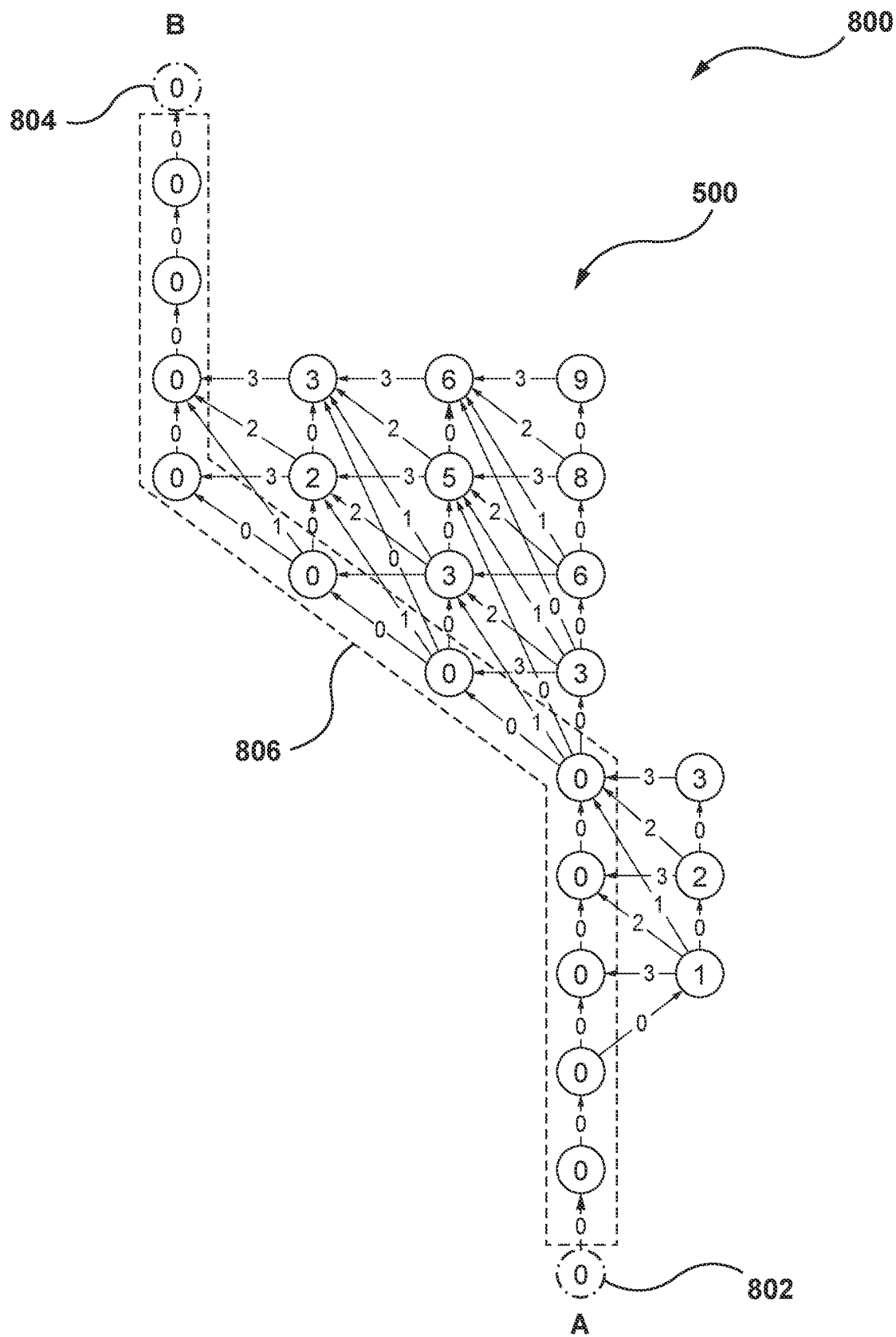
FIG. 8 depicts the graph-structure of FIG. 5 with costs assigned to respective edges and global penalty scores assigned to respective vertices, in accordance with some embodiments of the present technology.

With reference to FIG. 8, let it be assumed that representation 800 illustrates the graph-structure 500 with the costs of respective edges and the global penalty scores of respective vertices. In this case, the graph-structure 500 has an origin vertex 802 associated with the origin location 302 (see FIG. 3) and has a destination vertex 804 associated with the destination location 304 (see FIG. 3). Also, the graph-structure 500 has a number of other vertices and edges, and where each edge is associated with a respective cost and each vertex is associated with a respective global penalty score.

It should be noted that global penalty score associated with the origin vertex 802 is "0" since the lowest cumulative cost of edges connecting the destination vertex 804 with the origin vertex 802 is associated with a sequence of edges (included in a delimited portion 806) having a cumulative cost of "0". It should further be noted that the electronic device 210 may be configured to store the graph-structure 500 with the respective costs and global penalty scores in the storage 250 for further processing during operation of the vehicle 220.

Local Scoring Model

The electronic device 210 may use a given graph-structure (with costs and global penalty scores) for determining which sequence of potential locations may yield a lowest global cost for travelling from the origin location to the destination location if the vehicle 220 is to travel along the corresponding sequence of potential locations, as explained above. However, the developers of the present technology have realized that during operation of the vehicle 220, some transitions between potential locations of such a sequence may not be possible (due to road blocks, traffic, accidents, and the like), and/or may include too many lane-changing manoeuvres although being globally less costly than other sequences of potential locations that would allow travelling to the destination location from the original location.

To that end, developers of the present technology have devised methods and systems which allow, instead of following the sequence of potential locations yielding a lowest global cost, applying a "local scoring model" on a portion of the given graph-structure during operation of the vehicle 220 in order to "locally adjust" costs of at least some edges of the graph-structure 500 for determining "locally-adjusted penalty scores" of at least some vertices of the graph-structure 500 based on current information about the surroundings of the vehicle 220.

In at least some embodiments of the present technology, this local adjustment of costs and penalty scores by the electronic device 210 may allow determining (and/ranking) lane-level alternatives for proceeding to the destination location 304 while following the route 306. As it will become apparent from the description herein further below, in at least some cases, this local adjustment of previously determined costs and global penalty scores may allow the electronic device 210 to reduce the likelihood of performing lane-changing manoeuvres during operation of the vehicle 220 when travelling towards the destination location 304 on the route 306. In some embodiments, it can be said that this local adjustment of previously determined costs and global penalty scores may allow the electronic device 210 to control operation of the vehicle 220 in a manner that may reduce a total number of lane-changing manoeuvres that the vehicle 220 is to perform while following the route 306.

How the electronic device 210 is configured to locally adjust the costs and global penalty scores during operation of the vehicle 220 based on current information provided to the electronic device 210 will now be described in greater details.

Figure 9:
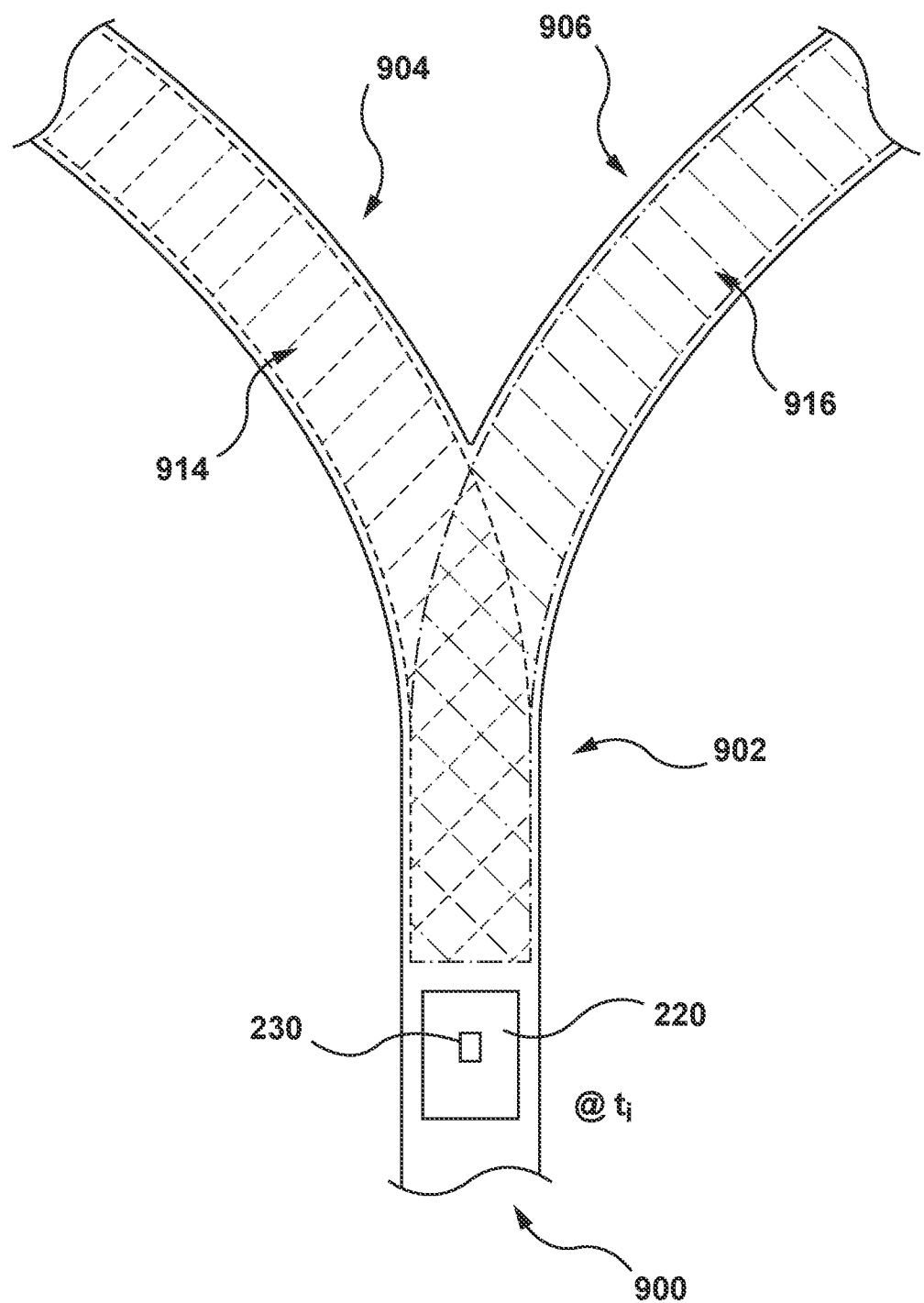
FIG. 9 depicts a first lane path and a second lane path that the electronic device of FIG. 2 may be configured to acquire during operation, in accordance with some embodiments of the present technology.
Figure 10:
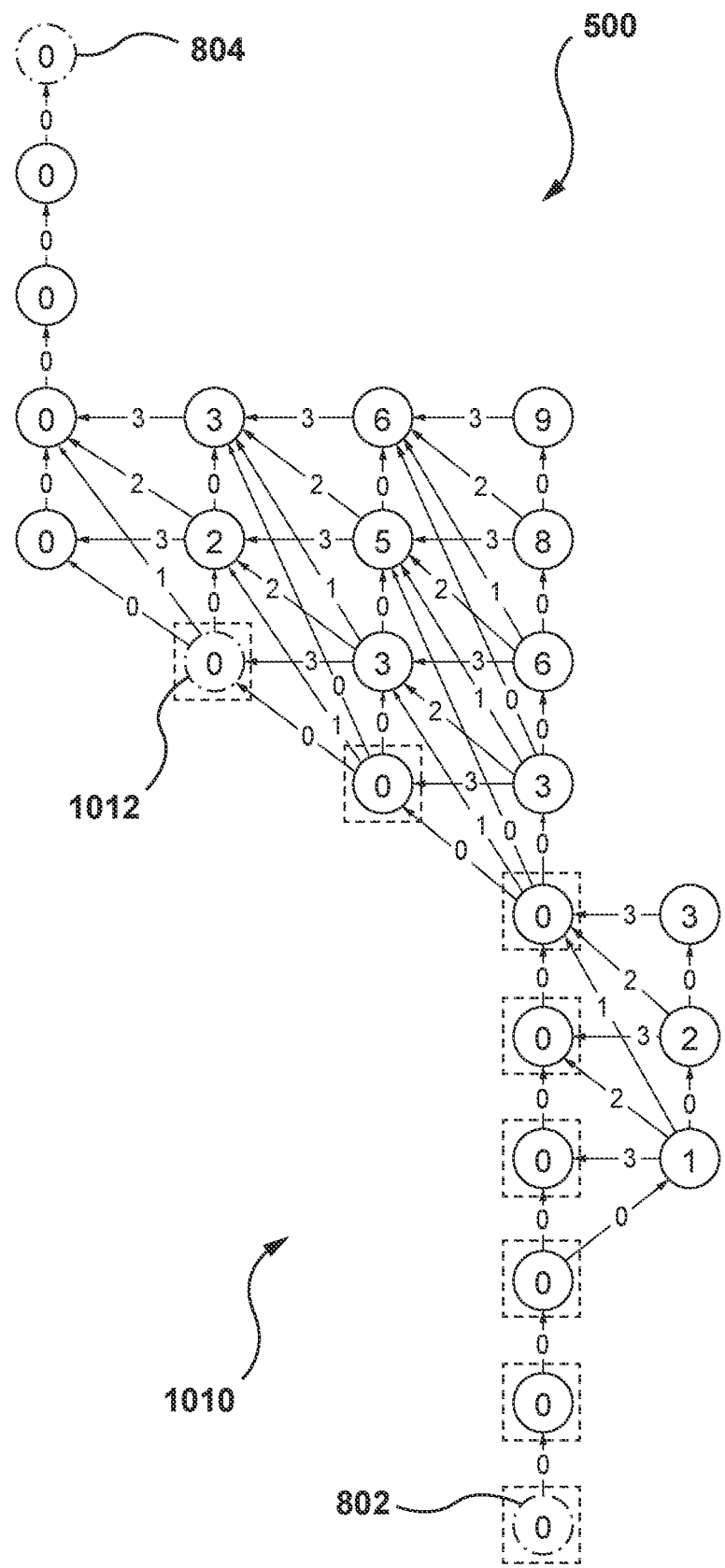
FIG. 10 depicts a first series of vertices for a first lane path that the electronic device 210 may be configured to acquire during operation, in accordance with some embodiments of the present technology.
Figure 11:
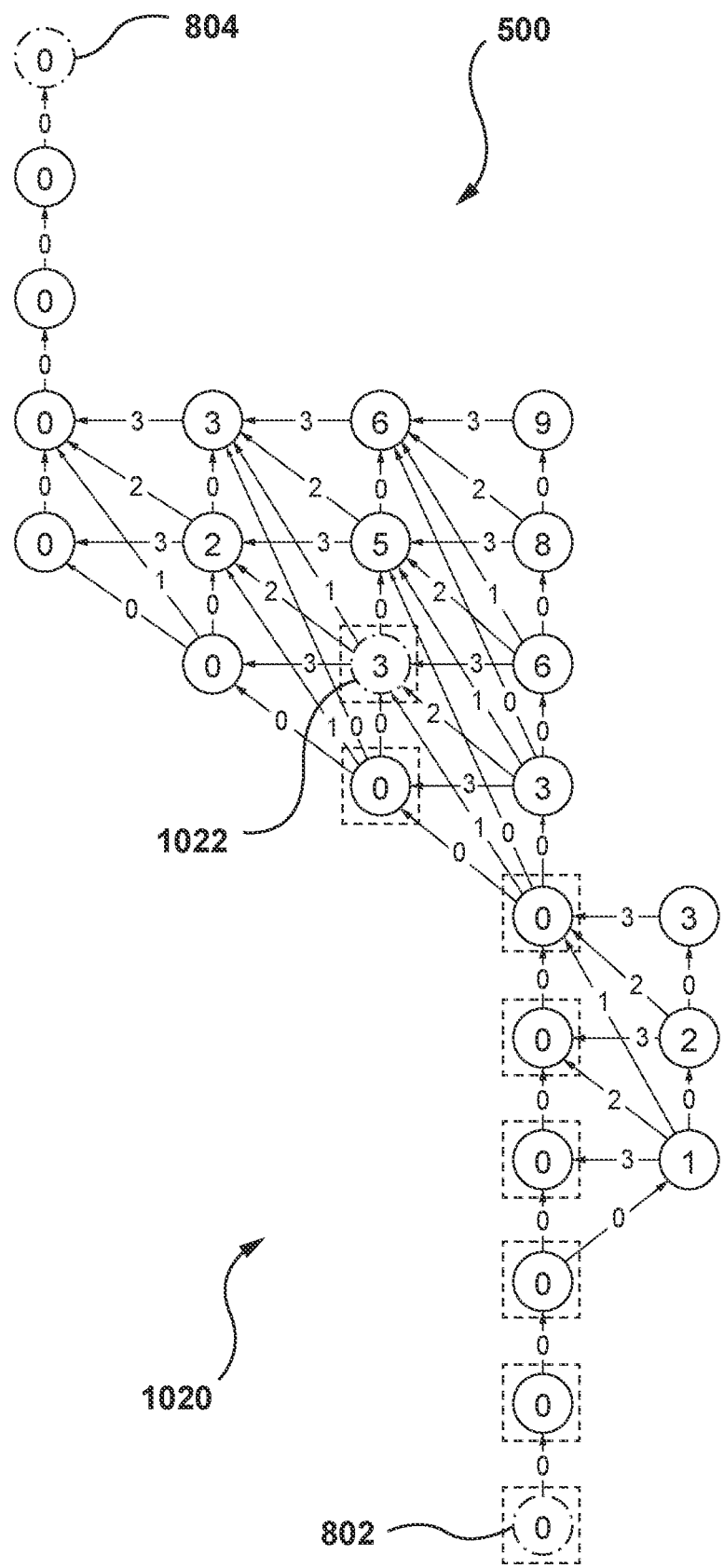
FIG. 11 depicts a second series of vertices for a second lane path that the electronic device 210 may be configured to acquire during operation, in accordance with some embodiments of the present technology.
Figure 12:
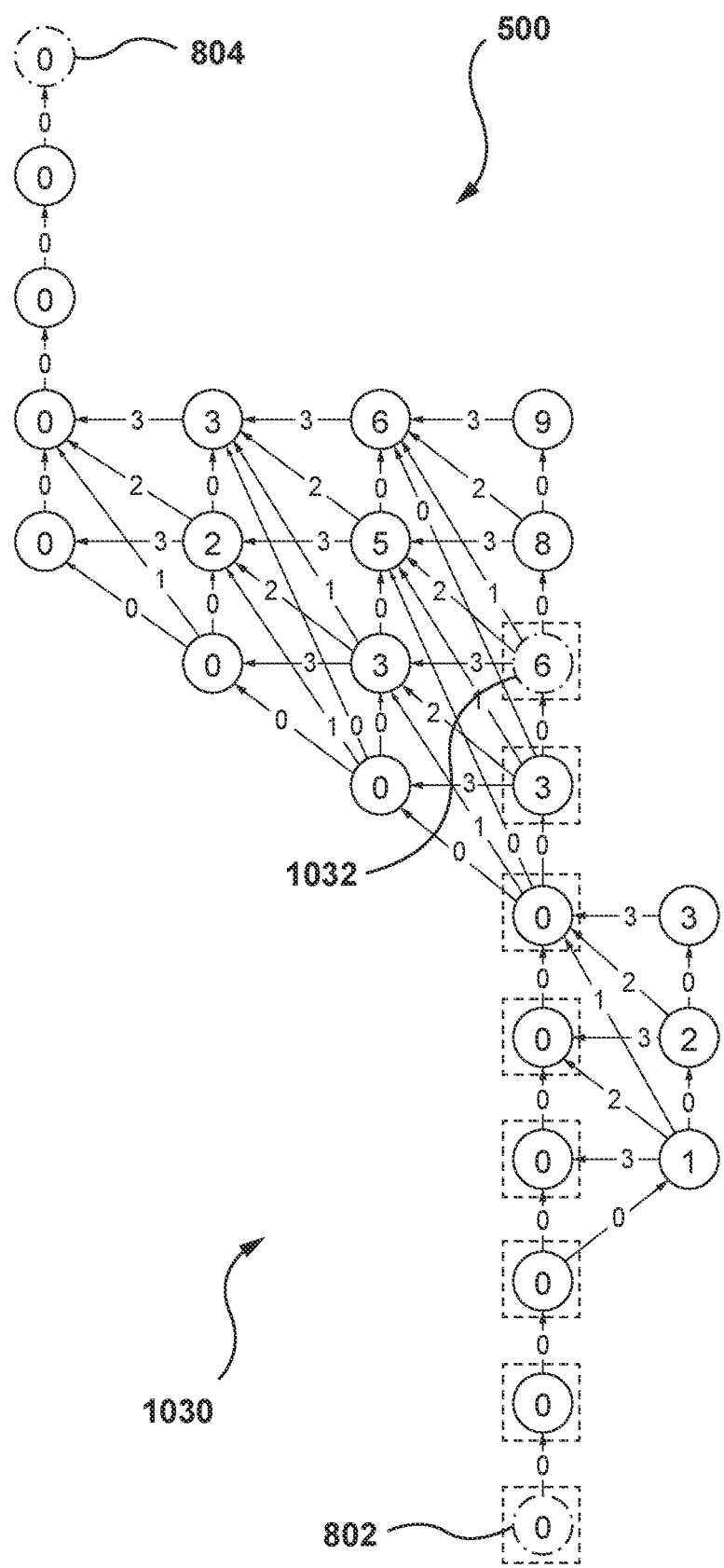
FIG. 12 depicts a third series of vertices for a third lane path that the electronic device 210 may be configured to acquire during operation, in accordance with some embodiments of the present technology.
Figure 13:
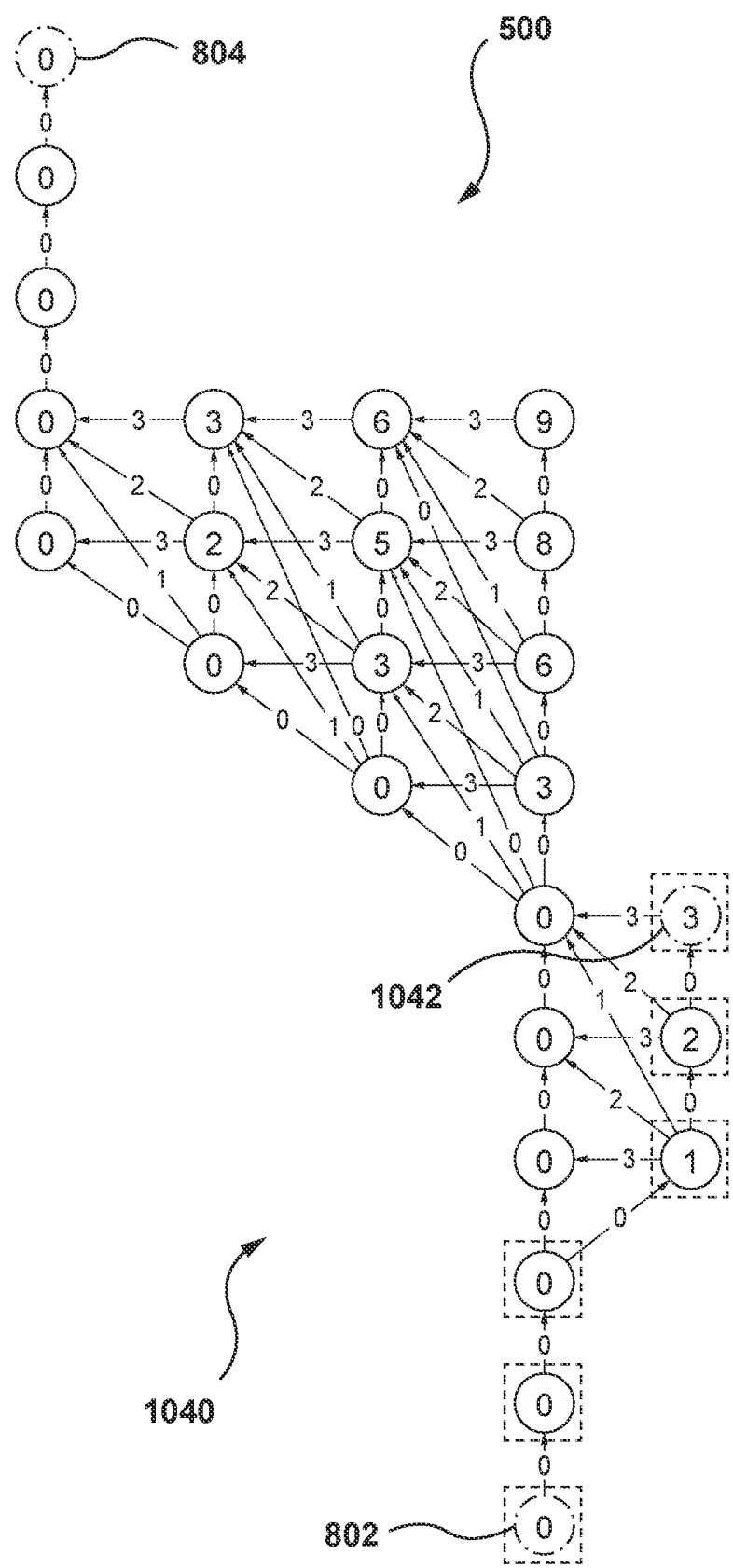
FIG. 13 depicts a fourth series of vertices for a fourth lane path that the electronic device 210 may be configured to acquire during operation, in accordance with some embodiments of the present technology.
Figure 14:
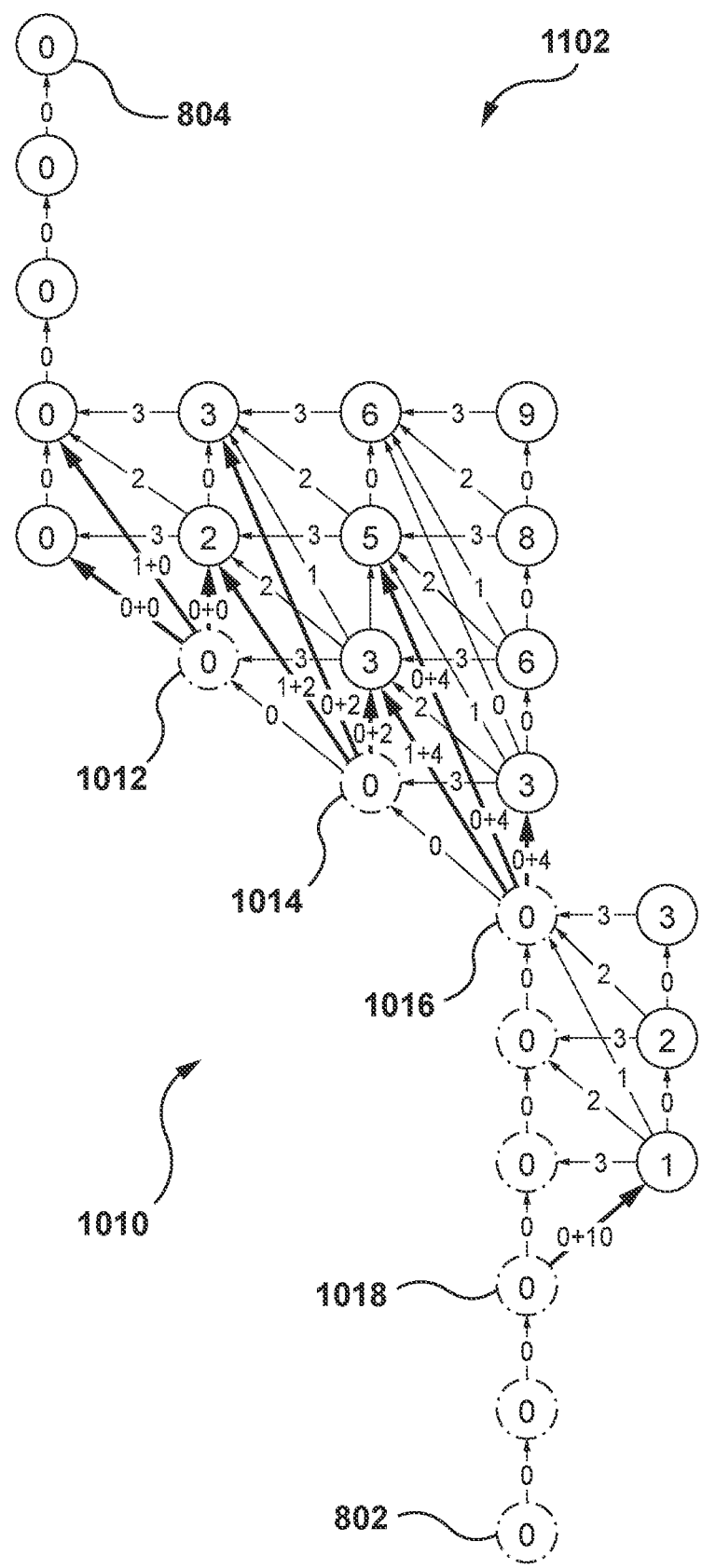
FIG. 14 depicts lane-path-departing edges identified for the first series of vertices of FIG. 10 with respective locally-adjusted penalty scores of the first series of vertices, in accordance with some embodiments of the present technology.
Figure 15:
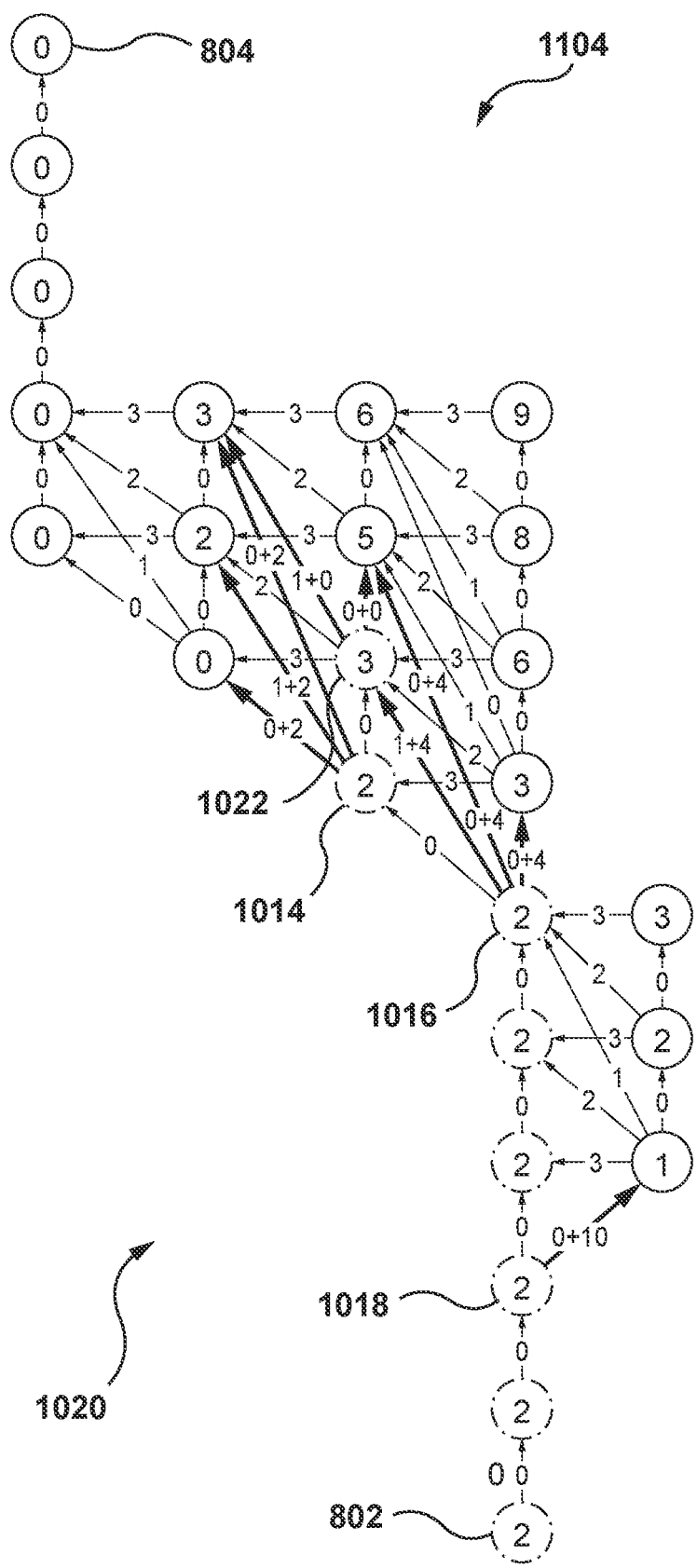
FIG. 15 depicts lane-path-departing edges identified for the second series of vertices of FIG. 11 with respective locally-adjusted penalty scores of the second series of vertices, in accordance with some embodiments of the present technology.
Figure 16:
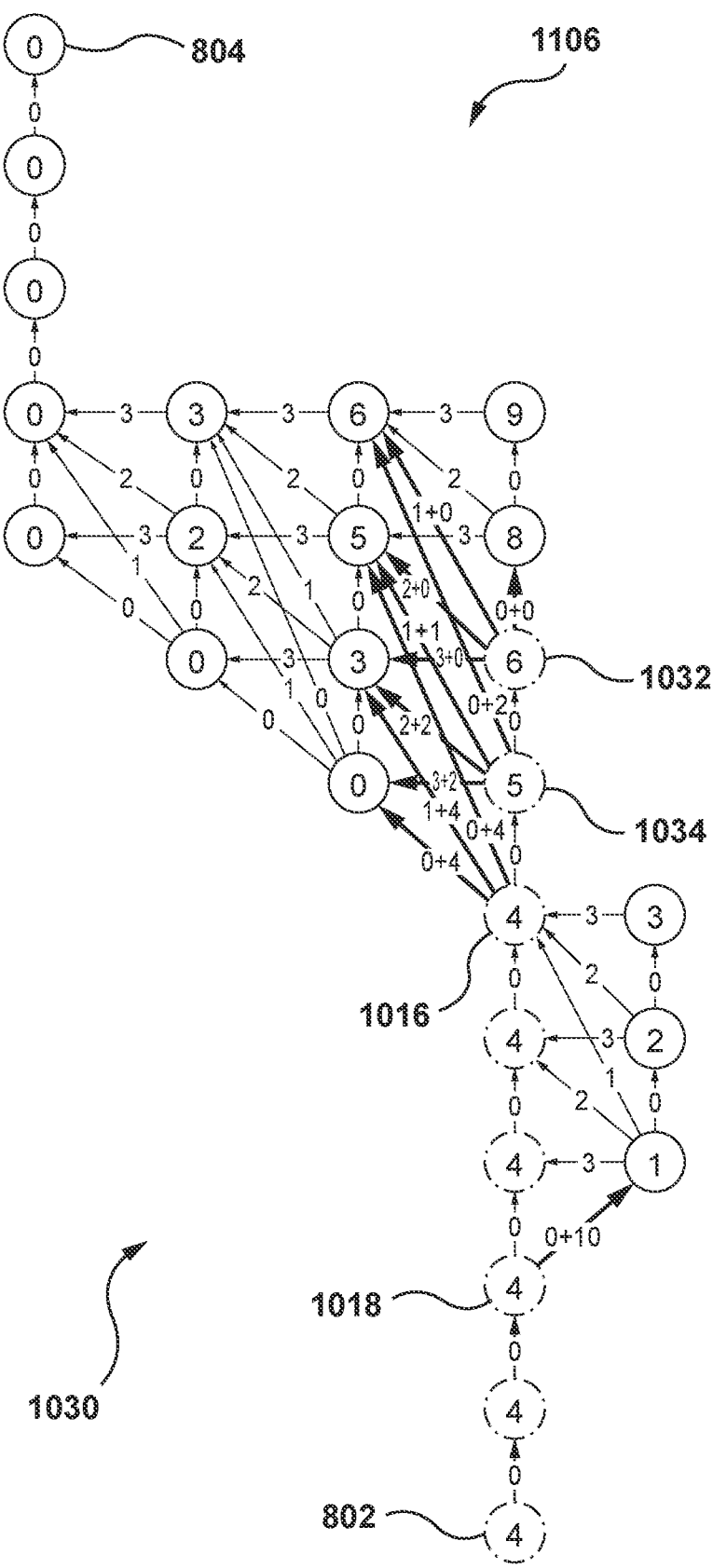
FIG. 16 depicts lane-path-departing edges identified for the third series of vertices of FIG. 12 with respective locally-adjusted penalty scores of the third series of vertices, in accordance with some embodiments of the present technology.
Figure 17:
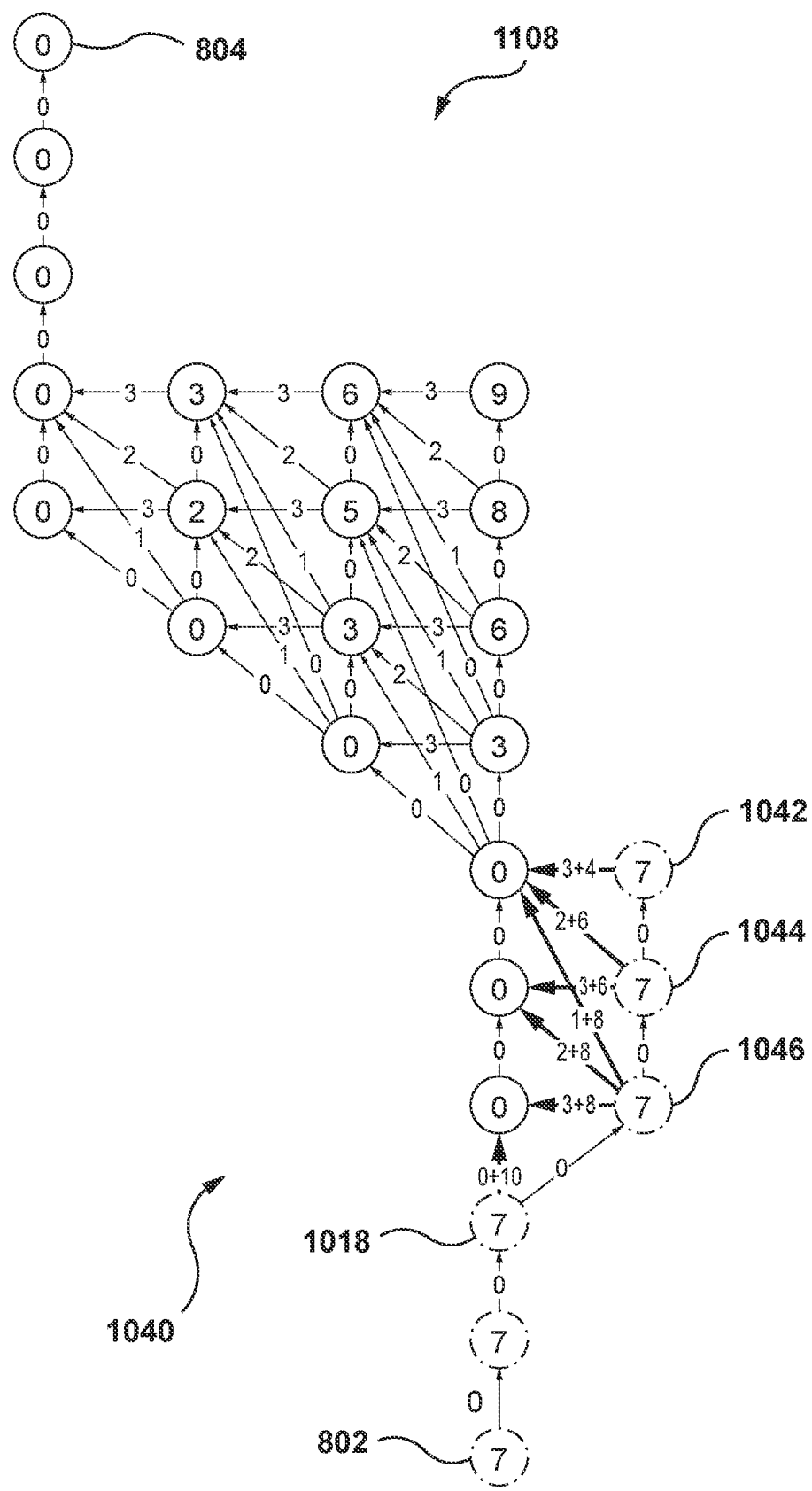
FIG. 17 depicts lane-path-departing edges identified for the fourth series of vertices of FIG. 13 with respective locally-adjusted penalty scores of the fourth series of vertices, in accordance with some embodiments of the present technology.

With reference to FIG. 9, let it be assumed that at a given moment in time the vehicle 220 is located on a road 900, having a common portion 902 having a single lane and which splits into a left portion 904 and a right portion 906. The electronic device 210 may acquire current information about the surroundings of the vehicle 220 in a form of a first "lane path" 914, and a second "lane path" 916. Broadly speaking, a given lane path for the current location of the vehicle 220 is indicative of a respective lane segment extending from the current location of the vehicle 220 and which the vehicle 220 can follow without performing a lane-changing manoeuvre.

For example, the first lane path 914 is indicative of a given lane segment extending from the current location of the vehicle 220 at $t_i$ and which the vehicle 220 can follow without performing a lane-changing manoeuvre. Indeed, the vehicle 220 does not require performing a lane-changing manoeuvre for traveling from the common portion 902 to the left portion 904 of the road 900. In the same example, the second lane path 916 is indicative of an other given lane segment extending from the current location of the vehicle 220 at $t_i$ and which the vehicle 220 can follow without performing a lane-changing manoeuvre. Indeed, the vehicle 220 does not require performing a lane-changing manoeuvre for traveling from the common portion 902 to the right portion 906 of the road 900. In this example, the first lane path 914 and the second lane path 916 partially overlap (covering the common portions 902).

It should be noted that information indicative of lane paths may be acquired from an external device (not depicted). It is contemplated that information indicative of lane paths may be generated by the external device based on inter alia sensor data provided thereto by the sensor system 230 of the vehicle 220. For that reason, a number and lengths of lane paths may vary depending on the specific situation in which the vehicle 220 currently finds itself and depending on various implantations of the present technology. In one example, lengths of lane paths may be limited by a detection horizon of the sensor system 230. In another example, the number of lane paths may be limited by the specific situation in which the vehicle 220 finds itself during operation.

Irrespective of how many lane paths are acquired by the electronic device 210 at the given moment in time, the electronic device 210 may process the information indicative of a respective lane path in a similar manner. How the electronic device 210 is configured to use/process information indicative of different lane paths will now be described in greater detail.

Let it be assumed that at a given moment in time, the vehicle 220 is located at the origin location 302 of the route 306—for example, the vehicle 220 is beginning travelling along the route 306—and the electronic device 210 acquires at the given moment in time four different lane paths extending from the origin location 302, each of which is indicative of a respective lane segment extending from the current location (origin location 302), and each of which the vehicle 220 can potentially follow without performing any lane-changing manoeuvre. In such a case, the electronic device 210 may be configured to identify, for each one of the four lane paths, a respective series of vertices from the graph-structure 500 (e.g., a portion of the graph-structure 500) covered by the respective lane segment of the respective lane path.

To better illustrate this, reference will now be made to FIGS. 10 to 13 depicting the graph-structure 500 with costs and global penalty scores (as previously discussed) where four series of vertices are identified and which are associated with respective ones from the four lane paths acquired by the electronic device 210. More specifically, the electronic device 210 may be configured to identify:

- a first series of vertices 1010 (see FIG. 10) associated with respective potential locations that are covered by the lane segment of a first lane path acquired by the electronic device 210;
- a second series of vertices 1020 (see FIG. 11) associated with respective potential locations that are covered by the lane segment of a second lane path acquired by the electronic device 210;
- a third series of vertices 1030 (see FIG. 12) associated with respective potential locations that are covered by the lane segment of a third lane path acquired by the electronic device 210; and
- a fourth series of vertices 1040 (see FIG. 13) associated with respective potential locations that are covered by the lane segment of a fourth lane path acquired by the electronic device 210.

Again, it should be noted that each lane path is indicative of a respective lane segment extending from a current location of the vehicle 220 and which the vehicle 220 can follow without performing a lane-changing manoeuvre. Therefore, this means that none of the edges connecting (i) the first series of vertices 1010, and/or (ii) the second series of vertices 1020, and/or (iii) the third series of vertices 1030, and/or (iv) the fourth series of vertices 1040, is indicative of a transition corresponding to a lane-changing manoeuvre.

It should also be noted that each of the first, the second, the third, and the fourth series of vertices 1010, 1020, 1030, and 1040, begins at the current location of the vehicle 220 which is the origin location 302. As a result, each of the first, the second, the third, and the fourth series of vertices 1010, 1020, 1030, and 1040, begins with the origin vertex 802.

However, it should be noted that each of the first, the second, the third, and the fourth series of vertices 1010, 1020, 1030, and 1040, end at a respective end vertex associated with a respective potential location that corresponds to an end of the respective lane segment of the respective lane path. More specifically, it should be noted that the first series of vertices 1010 has a first end vertex 1012, the second series of vertices 1020 has a second end vertex 1022, the third series of vertices 1030 has a third end vertex 1032, and the fourth series of vertices 1040 has a fourth end vertex 1042.

In some embodiments of the present technology, the electronic device 210 may be configured to apply the local scoring model onto the graph-structure 500 for assigning additional costs to at least some edges of a given series of vertices associated with a given lane path, thereby determining locally-increased costs of the at least some edges. The electronic device 210 may then be configured to determine "locally-adjusted" penalty scores for vertices in respective series of vertices based on inter alia the locally-increased costs of the at least some edges.

As it will become apparent from the description herein below, it should be noted that the electronic device 210 may be configured to do so (i.e., determine locally-increased costs and locally-adjusted penalty scores) independently for each series of vertices and/or for each associated lane path. In other words, locally-increased costs and locally-adjusted penalty scores determined for a given series of vertices are determined independently of locally-increased costs and locally-adjusted penalty scores determined for an other given series of vertices. It can also be said that determination of locally-increased costs and locally-adjusted penalty scores for the given series of vertices does not affect determination of locally-increased costs and locally-adjusted penalty scores for the other given series of vertices, and vice versa. It can also be said that determination of locally-increased costs and locally-adjusted penalty scores may be performed iteratively for each respective series of vertices and/or lane path, and where a given iteration does not depend on a previous iteration.

With reference to FIGS. 14 to 17, there is depicted four representations of the graph-structure 500, namely a first representation 1102 (see FIG. 14), a second representation 1104 (see FIG. 15), a third representation 1106 (see FIG. 16), and a fourth representation 1108 (see FIG. 17), each associated with a respective lane path and a respective series of vertices.

On the first representation 1102, there is depicted the first series of vertices 1010 associated with the first lane path. As mentioned above, the electronic device 210 may be configured to apply the local scoring model onto the graph-structure 500 for assigning additional costs to at least some edges stemming from the first series of vertices 1010. It should be noted that the local scoring model may be used for assigning additional costs only to "lane-path-departing" edges associated with the first series of vertices 1010.

For example, the first series of vertices 1010 are connected amongst each other by "lane-path-following" edges which are indicative of transitions that would allow the vehicle 220 to follow the first lane path. However, some of the series of vertices 1010 have other edges stemming therefrom and which do not correspond to lane-path-following edges—this means that these other edges are indicative of transitions that would allow the vehicle 220 to depart from the first lane path. These other edges, illustrated as bolded edges on the first representation 1102, may be determined by the electronic device 210 as lane-path-departing edges for the first lane path.

Thus, it can be said that the electronic device 210 employing the local scoring model may be configured to (i) determine which edges of the graph-structure 500 correspond to lane-path-departing edges of the first series of vertices 1010, and (ii) assign additional costs to lane-path-departing edges of the first series of vertices 1010, in addition to the costs that have been previously assigned by the global scoring model to the lane-path-departing edges of the first series of vertices 1010.

To better illustrate this, let's consider the three lane-path-departing edges of a vertex 1014 of the first series of vertices 1010. As mentioned above, the electronic device 210 may be configured to use the global scoring model for assigning these three lane-path-departing edges with respective costs of "1", "0", and "0", and which are indicative of desirability of the corresponding transitions. Now, the electronic device 210 may be configured to assign additional costs to each one of these lane-path-departing edges of the vertex 1014. For example, the electronic device 210 may assign an additional cost of "2" to each one of these lane-path-departing edges. As a result, the electronic device 210 may thereby be configured to determine locally-increased costs for these lane-path-departing edges which now are "3", "2", and "2".

In a same example, let's consider the three lane-path-departing edges of a vertex 1016 of the first series of vertices 1010. As mentioned above, the electronic device 210 may be configured to use the global scoring model for assigning these three lane-path-departing edges with respective costs of "1", "0", and "0", and which are indicative of desirability of the corresponding transitions. Now, the electronic device 210 may be configured to assign additional costs to each one of these lane-path-departing edges of the vertex 1016. For example, the electronic device 210 may assign an additional cost of "4" to each one of these lane-path-departing edges. As a result, the electronic device 210 may thereby be configured to determine locally-increased costs for these lane-path-departing edges which now are "5", "4", and "4".

In a same example, let's consider the lane-path-departing edge of a vertex 1018 of the first series of vertices 1010. As mentioned above, the electronic device 210 may be configured to use the global scoring model for assigning this lane-path-departing edge with a respective cost of "0", and which is indicative of desirability of the corresponding transition. Now, the electronic device 210 may be configured to assign additional costs to this lane-path-departing edge of the vertex 1018. For example, the electronic device 210 may assign an additional cost of "10" to this lane-path-departing edge. As a result, the electronic device 210 may thereby be configured to determine locally-increased costs for this lane-path-departing edges which now is "10".

In some embodiments of the present technology, it is contemplated that the electronic device 210 employing the local scoring model may be configured to weigh values of the additional costs for lane-path-departing edges depending on how "early" or "late" the corresponding vertex is in the first sequence of vertices 1010. For example, it should be noted that the vertex 1018 is an "earlier" vertex in the first series of vertices 1010 than the vertex 1016, and/or the vertex 1016 is a "later" vertex in the first series of vertices 1010 than the vertex 1018. Recalling that the electronic device 210 assigned an additional cost of "10" to the lane-path-departing edge of the vertex 1018, while assigning an additional cost of "4" to the lane-path-departing edges of the vertex 1016, the electronic device 210 may be configured to so-weigh values of additional costs in order to increase costs of early departures from the first lane path more than the costs of later departures from the first lane path.

It is contemplated that once the locally-increased costs of lane-path-departing edges of the first series of vertices 1010 are determined, the electronic device 210 may be configured to determine locally-adjusted penalty scores for respective vertices of the first series of vertices 1010, which are indicative of a value that is a lowest cumulative cost of edges connecting the respective vertex to the destination vertex 804.

For example, the electronic device 210 may be configured to employ dynamic programming method(s), as previously explained, to achieve this. Nevertheless, although the dynamic programming method(s) may be used for determining locally-adjusted penalty score in a similar manner to what has been described above, the locally-adjusted penalty scores may be different from the corresponding global penalty scores since the costs of lane-path-departing edges are no longer the same as they were when the global penalty scores have been determined.

To better illustrate this, let's consider the second representation 1104, showing the second series of vertices 1020 associated with the second lane path. The electronic device 210 may be configured to apply the local scoring model onto the graph-structure 500 for assigning additional costs to lane-path-departing edges of the second series of vertices 1020.

First, it is important to note that assignment of additional costs for lane-path-departing edges of the second series of vertices 1020 is performed by the electronic device 210 independently from the assignment of the additional costs for the lane-path-departing edges of the first series of vertices 1010. Indeed, since the first series of vertices 1010 includes different vertices than the second series of vertices 1020, the lane-path-departing edges for the first series of vertices 1010 are not the same as the lane-path departing edges (although some are) of the second series of vertices 1020.

It can be said that, (i) during a first given iteration, the electronic device 210 may be configured to determine locally-increased costs of lane-path-departing edges of the first series of vertices 1010 and the locally-adjusted penalty scores of respective vertices of the first series of vertices 1010, and (ii) during a second given iteration, the electronic device 210 may be configured to do the same for the second series of vertices 1020 without taking into account any determination having been made during the first given iteration.

Once the electronic device 210 assigns additional costs to the lane-path-departing edges of the second series of vertices 1020 and thereby generates locally-increased costs for these lane-path departing edges, similarly to how the electronic device 210 assigns additional costs to the lane-path-departing edges of the first set of vertices 1010, the electronic device 210 may be configured to make use of dynamic programming method(s) for determining locally-adjusted penalty scores for each vertex of the second series of vertices 1020.

In some embodiments of the present technology, it can be said that determining the locally-adjusted penalty scores may include using same and/or different dynamic programming method(s) as previously used when determining the global penalty scores and where, now this dynamic programming method(s) may be applied on locally-adjusted information about the lane-path-departing edges of the second series of vertices 1020.

For example, the electronic device 210 may be configured to determine that a locally-adjusted penalty score for the vertex 1014 of the second series of vertices 1020 is "2", while the respective global penalty score of the vertex 1014 is "0". In this case, this difference is due to the fact that, since the lane-path-departing edges of the second series of vertices 1020 are now associated with increased (different) costs, the lowest cumulative cost of edges connecting the vertex 1014 of the second series of vertices 1020 also increases. However, this might not be the case in each and every embodiment of the present technology. In another example, with reference to the first representation 1102, the locally-adjusted penalty score of the vertex 1014 of the first series of vertices 1010 is "0", and is the same that the respective global penalty score. In this case, this is due to the fact that the first series of vertices 1010 is associated with different lane-path-departing edges than the second series of vertices 1020, and which affects the lowest cumulative cost of edges for connecting the vertex 1014 in the first series of vertices 1010 to the destination vertex 804 in a different manner in which it affects the lowest cumulative cost of edges for connecting the vertex 1014 in the second series of vertices 1020 to the destination vertex 804. Indeed, the lowest cumulative cost for the vertex 1014 may not affected by locally increased costs of lane-path-departing edges of the first series of vertices 1010, while the lowest cumulative cost for the vertex 1014 of the second series of vertices 1020 is increased to "2" due to the locally-increased costs of the lane-path-departing edges of the second series of vertices 1020.

The electronic device 210 may be configured to determine locally-increased costs of lane-path departing edges of the third series of vertices 1030 associated with the third lane path, and the locally-increased costs of lane-path departing edges of the fourth series of vertices 1040 associated with the fourth lane path in a similar manner to how the electronic device 210 determines the locally-increased costs of lane-path departing edges of the first series of vertices 1010 associated with the first lane path, and the locally-increased costs of lane-path departing edges of the second series of vertices 1020 associated with the second lane path. The electronic device 210 may be configured to determine locally-adjusted penalty scores of vertices in the third series of vertices 1030, and locally-adjusted penalty scores of vertices in the fourth series of vertices 1040 in a similar manner to how the electronic device 210 determines the locally-adjusted penalty scores of vertices in the first series of vertices 1010, and the locally-adjusted penalty scores of vertices in the second series of vertices 1020—that is, while taking into account the locally-adjusted costs of corresponding lane-path-departing edges, and while not taking into account the locally-adjusted costs of lane-path-departing edges associated with other series of vertices.

In some embodiments of the present technology, the electronic device 210 may be configure to identify a lane path score for each of the four lane paths acquired by the electronic device 210. Broadly speaking, the lane path score for a given lane path is the locally-adjusted penalty score of the current vertex (or as in this example, the origin vertex 802) in the respective series of vertices.

For example, a first lane path score for the first lane path is "0", since it is the value of locally-adjusted penalty score of the origin vertex 802 in the first series of vertices 1010 associated with the first lane path. In a same example, a second lane path score for the second lane path is "2", since it is the value of locally adjusted penalty score of the origin vertex 802 in the second series of vertices 1020 associated with the second lane path. In the same example, a third lane path score for the third lane path is "4", since it is the value of locally adjusted penalty score of the origin vertex 802 in the third series of vertices 1030 associated with the third lane path. In the same example, a fourth lane path score for the fourth lane path is "7", since it is the value of locally adjusted penalty score of the origin vertex 802 in the fourth series of vertices 1040 associated with the fourth lane path.

It should be noted that a given lane path score is indicative of a cost for the vehicle 220 for following the corresponding lane segment of the respective lane path (and which the vehicle 220 can follow without performing a lane changing manoeuvre).

In some embodiments, the electronic device 210 may be configured to use the lane path scores for ranking the four lane paths in accordance with the respective lane path scores and/or for selecting a target lane path amongst the four lane paths to be further used for controlling operation of the vehicle 220. In this example, the first lane path is associated with a lowest lane path score amongst the four lane path scores. Accordingly, the electronic device 210 may be configured to rank the four lane paths where the first lane path is ranked as being first, and/or select the first lane path as the target lane path. The electronic device 210 may then be configured to generate one or more trajectories for the vehicle 220 along the corresponding lane segment of the target lane path (first lane path), and may also control operation of the vehicle 220 such that the vehicle 220 follows one of the one or more trajectories along the corresponding lane segment of the target lane path.

However, let it be assumed that the electronic device 210 acquires, in addition to information indicative of the four lane paths, current information about its surroundings which is indicative of an accident along the corresponding lane segment of the first lane path. In such a case, the electronic device 210 may select a "next best" lane path as the target lane path. In this example, the electronic device 210 may be configured to select the second lane path as the new target lane path because it is associated with a second lowest lane path score amongst the four lane path scores.

Figure 18:
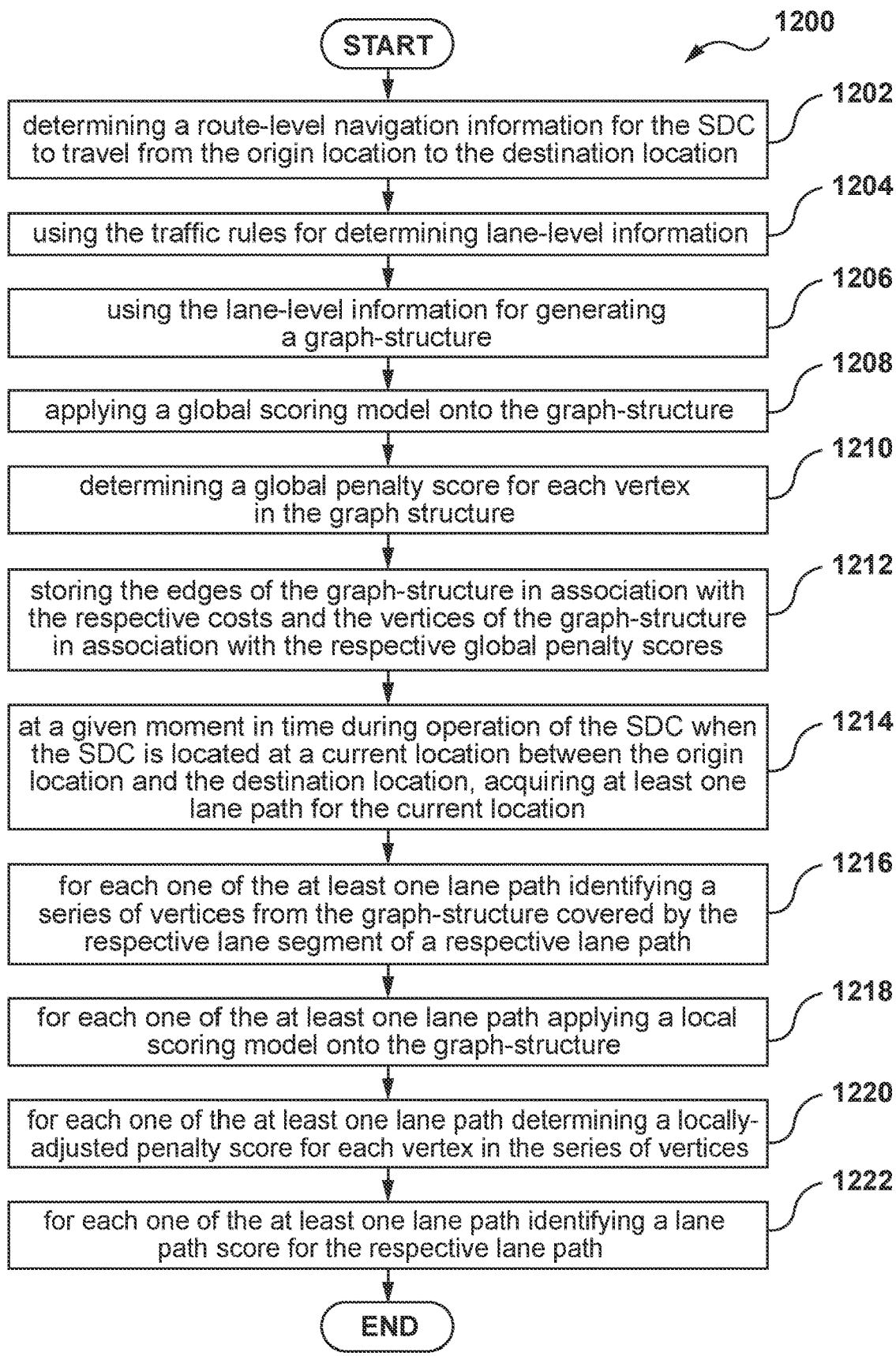
FIG. 18 is a scheme-block representation of a method, executable by the electronic device of FIG. 2, of controlling operation of the vehicle of FIG. 2, in accordance with some embodiments of the present technology.

In some embodiments of the present technology, the electronic device 210 may be configured to execute a method 1200 depicted in FIG. 18 of controlling operation of the vehicle 220. Various steps of the method 1200 will now be described in greater detail.

Step 1202: Determining a Route-level Navigation Information for the SDC to Travel from the Origin Location to the Destination Location The method 1200 begins at step 1202 with the electronic device 210 configured to determine route-level navigation information for the vehicle 220 to travel from the origin location 302 to the destination location 304. For example, as explained above, the route-level navigation information may include data representative of the route 306 (see FIG. 3) comprising one or more roads that the vehicle 220 may take for arriving at the destination location 304 from the origin location 302.

Step 1204: Using the Traffic Rules for Determining Lane-level Information

The method 1200 continues to step 1204 with the electronic device 210 using the traffic rules associated with the one or more roads of the route 306 for determining lane-level information. For example, the electronic device 210 may be configured to determine lane-level information about the route 306 which is indicative of inter alia presence of lanes on each one the one or more roads of the route 306.

Step 1206: Using the Lane-level Information for Generating a Graph-structure

The method 1200 continues to step 1206 with the electronic device 210 using the lane-level information for generating the graph-structure 500. As explained above, the graph-structure includes a plurality of vertices and a plurality of edges. Each vertex of a given graph-structure is associated with a respective potential location of the vehicle 220 on a given lane of a given road of the at least one road of a given route (e.g., see FIG. 6).

The plurality of vertices includes a given origin vertex associated with a respective origin location and a given destination vertex associated with a respective destination location. A given edge connects a respective pair of vertices in the given graph-structure. The given edge is indicative of a transition between the potential location associated with a first one of the respective pair of vertices and the potential location associated with the second one of the respective pair of vertices.

Step 1208: Applying a Global Scoring Model onto the Graph-structure

The method 1200 continues to step 1208 with the electronic device 210 configured to apply a global scoring model onto the graph-structure 500. The global scoring model is associated with a first set of criteria for assigning costs to respective edges, and where a given cost assigned to a respective edge is indicative of a desirability of the respective transition in accordance with the first set of criteria.

For example, with reference to FIG. 8, there is depicted the graph-structure 500 having costs assigned to respective edges thereof. In some embodiments, the first set of criteria is indicative of that a given transition corresponding to the SDC keeping its lane is more desirable than an other given transition corresponding to the SDC performing a lane-changing manoeuvre. In an other embodiment, the first set of criteria is indicative of that a given transition corresponding to the SDC performing a slow lane-changing manoeuvre is more desirable than an other given transition corresponding to the SDC performing a rapid lane-changing manoeuvre.

Step 1210: Determining a Global Penalty Score for each Vertex in the Graph-structure The method 1200 continues to step 1210 with the electronic device 210 configured to determine a global penalty score for each vertex in the graph-structure 500. For example, in FIG. 8, there is depicted the graph-structure 500 having global penalty scores assigned to respective vertices thereof.

It should be noted that a given global penalty score for a respective vertex is a lowest cumulative cost of edges connecting a respective vertex and the destination vertex. The given global penalty score is indicative of a lowest global cost for the SDC for travelling to the destination location if the SDC finds itself in the potential location of the respective vertex.

Step 1212: Storing the Edges of the Graph-structure in Association with the Respective Costs and the Vertices of the Graph-structure in Association with the Respective Global Penalty Scores The method 1200 continues to step 1212 with the electronic device 210 configured to store the graph-structure 500 with the costs of respective edges and the global penalty scores of respective vertices. For example, the electronic device 210 may be configured to store the graph-structure 500 with the costs of the respective edges and the global penalty scores of respective vertices in a local and/or remote storage for later use thereof. For example, this information may be stored by the electronic device 210 for use during operation of the vehicle 220.

Step 1214: At a Given Moment in Time During Operation of the SDC when the SDC is Located at a Current Location Between the Origin Location and the Destination Location, Acquiring at Least One Lane Path for the Current Location The method 1200 continues to step 1214 with the electronic device 210 configure to, at a given moment in time during operation of the vehicle 220 when the vehicle 220 is located at a current location between the origin location and the destination location, acquire at least one lane path for the current location.

As explained above, the electronic device 210 may acquire at the given moment in time information about its current surroundings and data indicative of the at least one lane path may be part of this information. For example, the at least one lane path is indicative of a respective lane segment extending from the current location of the vehicle 220 and that the vehicle 220 may follow without a lane-changing manoeuvre.

Step 1216: For each One of the at Least One Lane Path Identifying a Series of Vertices from the Graph-structure Covered by the Respective Lane Segment of a Respective Lane Path The method 1200 continues to step 1216 with the electronic device 210 configured to, for each lane path, identify a respective series of vertices from the graph-structure 500 covered by the respective lane segment of the respective lane path. For example, with reference to FIGS. 10 to 13, there is depicted the first series of vertices 1010 for the first lane path, the second series of vertices 1020 for the second lane path, the third series of vertices 1030 for the third lane path, and the fourth series of vertices 1040 for the fourth lane path.

It should be noted that a given series of vertices (i) begins at a current vertex associated with a respective potential location that corresponds to the current location of the vehicle 220, and (ii) ends at a respective end vertex associated with a respective potential location that corresponds to an end of the respective lane segment (of the respective lane path).

Step 1218: For each One of the at Least One Lane Path Applying a Local Scoring Model onto the Graph-structure The method 1200 continues to step 1218 with the electronic device 210 configured to, for each lane path, apply the local scoring model onto the graph-structure 500 for assigning additional costs to lane-path-departing edges of the respective series of vertices, thereby determining locally-increased costs of the lane-path-departing edges of the respective series of vertices.

It should be noted that the lane-path-departing edges are edges connecting the series of vertices with other vertices of the graph-structure excluding the respective series of vertices. In some embodiments, the electronic device 210 applying the local scoring model onto the graph-structure 500 may be configured to determine, for a given lane path and a respective series of vertices, which edges of the graph-structure 500 correspond to lane-path-following edges of that given lane path, and which edges of the graph-structure 500 correspond to lane-path-departing edges of that given lane path.

In some embodiments, the series of vertices of the a given lane path may include a first vertex and a second vertex and where the first vertex and the second vertex are included sequentially after the current vertex in the respective series of vertices. In this case, the additional cost assigned to at least one-path-departing edge of the first given vertex may be smaller than the additional cost assigned to at least one lane-path-departing edge of the second given vertex, so that the electronic device thereby increases more costs of early departures from the lane segment of the respective lane path than the costs of later departures from the lane segment of the respective lane path.

Step 1220: For each One of the at Least One Lane Path Determining a Locally-adjusted Penalty Score for each Vertex in the Series of Vertices The method 1200 continues to step 1220 with the electronic device 210 configured to, for each lane path, determine a locally-adjusted penalty score for each vertex of the respective series of vertices. For example, the electronic device 210 may be configured to determine locally-adjusted penalty scores for vertices from the first series of vertices associated with the first lane path.

It should be noted that a given locally adjusted penalty score for a respective vertex being a lowest cumulative cost of edges connecting the respective vertex and the destination vertex. It is contemplated that the electronic device 210 may be configured to use dynamic programming method(s) for determining the locally-adjusted penalty scores based on the locally-increased costs of the lane-path-departing edges, as explained above.

Step 1222: For each One of the at Least One Lane Path Identifying a Lane Path Score for the Respective Lane Path The method 1200 continues to step 1222 with the electronic device 210 configured to, for each lane path, identify a lane path score for the respective lane path. The lane path score for a given lane path is the locally-adjusted penalty score of the current vertex in the respective series of vertices of the respective lane path. The lane path score is indicative of a cost for the SDC for following the lane segment of the respective lane path without performing the lane-changing manoeuvre.

In some embodiments, the electronic device 210 may be configured to determine a first lane path score for a first lane path and a second lane path score for a second lane path. In such cases, the electronic device 210 may be configured to use the first lane path score and the second lane path score for selecting a target lane path amongst the first lane path and the second lane path. The target lane path is associated with a lowest one amongst the first lane path score and the second lane path score. The electronic device 210 may then generate a trajectory for the SDC along the lane segment of the target lane path. The electronic device 210 may also control the operation of the SDC such that the SDC follows the trajectory along the lane segment of the target lane path.

It is contemplated that the electronic device 210 may be configured to acquire lane paths at different moments in time during operation of the vehicle 220. As such, the electronic device 210 may be configured to determine respective lane path scores for these lane paths at different moments in time during operation of the vehicle 220.

It should be noted that in at least some embodiments of the present technology, the electronic device 210 may be configured to omit at least some steps of the method 1200. For example, the electronic device 210 may be configured to omit the step 1210, and as part of the step 1212, store the costs with the respective edges of the graph-structure 500 (without storing the global penalty scores from the omitted step 1210).

In this example, once the electronic device 210 determines the locally-increased costs of lane-path-departing edges of a series of vertices of a given lane path, the electronic device 210 may be configured to use (i) the locally-increased costs of these lane-path-departing edges and (ii) costs of other edges in the graph-structure 500 (having been determined and stored) for determining local penalty scores for each vertex from the series of vertices. Again, this may be achieved by employing one or more dynamic programming method(s) discussed above.

However, pre-computing and storing the global penalty scores may allow reducing computational requirements of the electronic device 210 during operation of the vehicle 220. In such a case, when determining a locally-adjusted penalty score for a given vertex of a series of vertices, the electronic device 210 may be configured to use global penalty scores (in this case having been already determined and stored) of at least some neighbouring vertices for reducing the number of computations, performed during execution of one or more dynamic programming method(s), for determining the lowest cumulative cost of edges linking the given vertex to the destination vertex.

In summary, it is contemplated the electronic device 210 may omit determining and storing global penalty scores for respective vertices of the graph-structure—however in such a case, during operation of the vehicle 220, the electronic device 210 may need to perform a larger number of operations for determining local penalty scores for the series of vertices of a given lane path than the number of operations that the electronic device 210 may need to perform for determining the locally-adjusted penalty scores for the series of vertices if the global penalty scores of vertices in the graph-structure have already been determined and stored.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of controlling operation of a Self-Driving Car (SDC), the SDC being associated with an electronic device, the electronic device having access to data representative of an origin location and a destination location, the method executable by the electronic device, the method comprising:
  determining, by the electronic device, a route-level navigation information for the SDC to travel from the origin location to the destination location,
    the route-level navigation information being indicative of at least one road that the SDC is to travel on from the origin location to the destination location,
    the at least one road being associated with traffic rules;
  using, by the electronic device, the traffic rules for determining lane-level information,
    the lane-level information being indicative of presence of at least one lane on each of the at least one road;
  using, by the electronic device, the lane-level information for generating a graph-structure,
    the graph-structure including a plurality of vertices and a plurality of edges,
      a given vertex being associated with a respective potential location of the SDC on a given lane of a given road of the at least one road,
        the plurality of vertices including an origin vertex associated with the origin location and a destination vertex associated with the destination location,
      a given edge connecting a respective pair of vertices in the graph-structure,
        the given edge being indicative of a transition between the potential location associated with a first one of the respective pair of vertices and the potential location associated with a second one of the respective pair of vertices;
  applying, by the electronic device, a global scoring model onto the graph-structure,
    the global scoring model being associated with a first set of criteria for assigning costs to respective edges,
      a given cost assigned to a respective edge being indicative of a desirability of the respective transition in accordance with the first set of criteria;
  determining, by the electronic device, a global penalty score for each vertex in the graph-structure,
    a given global penalty score for a respective vertex being a lowest cumulative cost of edges connecting a respective vertex and the destination vertex,
      the given global penalty score being indicative of a lowest global cost for the SDC for travelling to the destination location if the SDC finds itself in the potential location of the respective vertex;
  storing, by the electronic device, the edges of the graph-structure in association with the respective costs and the vertices of the graph-structure in association with the respective global penalty scores;
  at a given moment in time during operation of the SDC when the SDC is located at a current location between the origin location and the destination location,
  acquiring, by the electronic device, at least one lane path for the current location, the at least one lane path being indicative of a respective lane segment extending from the current location without a lane-changing maneuver;

for each one of the at least one lane path:
identifying, by the electronic device, a series of vertices from the graph-structure covered by the respective lane segment of a respective lane path,
a given series of vertices (i) beginning at a current vertex associated with a respective potential location that corresponds to the current location of the SDC, and (ii) ending at a respective end vertex associated with a respective potential location that corresponds to an end of the respective lane segment;
applying, by the electronic device, a local scoring model onto the graph-structure,
the local scoring model for assigning additional costs to lane-path-departing edges of the series of vertices,
the lane-path-departing edges connecting the series of vertices with other vertices of the graph-structure excluding the series of vertices,
thereby determining locally-increased costs of the lane-path-departing edges of the series of vertices;
determining, by the electronic device, a locally-adjusted penalty score for each vertex in the series of vertices,
a given locally adjusted penalty score for a respective vertex being a lowest cumulative cost of edges connecting the respective vertex and the destination vertex;
identifying, by the electronic device, a lane path score for the respective lane path,
the lane path score for the respective lane path being the locally-adjusted penalty score of the current vertex in the series of vertices of the respective lane path,
the lane path score being indicative of a cost for the SDC for following the lane segment of the respective lane path without performing the lane-changing maneuver,
the at least one lane path is a first lane path and a second lane path, and wherein the determining the lane path score comprises determining a first lane path score for the first lane path and a second lane path score for the second lane path, and wherein the method further comprises:
using, by the electronic device, the first lane path score and the second lane path score for selecting a target lane path amongst the first lane path and the second lane path,
the target lane path being associated with a lowest one amongst the first lane path score and the second lane path score;
generating, by the electronic device, a trajectory for the SDC along the lane segment of the target lane path; and
controlling, by the electronic device, the operation of the SDC such that the SDC follows the trajectory along the lane segment of the target lane path.

2. The method of claim 1, wherein the series of vertices of the respective lane path includes a first vertex and a second vertex, the first vertex and the second vertex being included sequentially after the current vertex in the series of vertices, and
wherein the additional cost assigned to at least one-path-departing edge of the first given vertex is smaller than the additional cost assigned to at least one lane-path-departing edge of the second given vertex, thereby increasing costs of early departures from the lane segment of the respective lane path than the costs of later departures from the lane segment of the respective lane path.

3. The method of claim 1, wherein the at least one lane path is a plurality of lane paths, the method further comprising:
ranking, by the electronic device, the plurality of lane paths based on the respective lane path scores such that a given lane path amongst the plurality of lane paths associated with a lowest lane path score amongst the respective lane path scores is ranked as a highest one amongst the plurality of lane paths.

4. The method of claim 1, wherein the first set of criteria is indicative of that a given transition corresponding to the SDC keeping its lane is more desirable than an other given transition corresponding to the SDC performing a lane-changing maneuver.

5. The method of claim 1, wherein the first set of criteria is indicative of that a given transition corresponding to the SDC performing a slow lane-changing maneuver is more desirable than an other given transition corresponding to the SDC performing a rapid lane-changing maneuver.

6. The method of claim 1, wherein the applying the local scoring model onto the graph-structure comprises identifying, by the electronic device, which edges of the graph-structure correspond to lane-path-following edges of the series of vertices and which edges of the graph-structure correspond to lane-path-departing edges of the series of vertices.

7. The method of claim 1, wherein the first lane path amongst the at least one lane path is associated with a first series of vertices and the second lane path amongst the at least one lane path is associated with a second series of vertices, and wherein the first and the second series of vertices comprise at least one common vertex from the graph-structure, and wherein the lane-path-departing edges of the at least one common vertex from the first series of vertices for the first lane path are different from the lane-path-departing edges of the at least one common vertex from the second series of vertices for the second lane path.

8. The method of claim 1, wherein the method further comprises:
determining, by the electronic device, lane path scores for lane paths acquired at respective different moments in time during operation of the SDC.

9. An electronic device for controlling operation of a Self-Driving Car (SDC), the SDC being associated with the electronic device, the electronic device having access to data representative of an origin location and a destination location, the electronic device being configured to:
determine a route-level navigation information for the SDC to travel from the origin location to the destination location,
the route-level navigation information being indicative of at least one road that the SDC is to travel on from the origin location to the destination location,
the at least one road being associated with traffic rules;
use the traffic rules for determining lane-level information,
the lane-level information being indicative of presence of at least one lane on each of the at least one road;
use the lane-level information for generating a graph-structure,
the graph-structure including a plurality of vertices and a plurality of edges, a given vertex being associated with a respective potential location of the SDC on a given lane of a given road of the at least one road, the plurality of vertices including an origin vertex associated with the origin location and a destination vertex associated with the destination location, a given edge connecting a respective pair of vertices in the graph-structure, the given edge being indicative of a transition between the potential location associated with a first one of the respective pair of vertices and the potential location associated with a second one of the respective pair of vertices;

apply a global scoring model onto the graph-structure,
the global scoring model being associated with a first set of criteria for assigning costs to respective edges,
a given cost assigned to a respective edge being indicative of a desirability of the respective transition in accordance with the first set of criteria;

determine a global penalty score for each vertex in the graph-structure,
a given global penalty score for a respective vertex being a lowest cumulative cost of edges connecting a respective vertex and the destination vertex,
the given global penalty score being indicative of a lowest global cost for the SDC for travelling to the destination location if the SDC finds itself in the potential location of the respective vertex;

store the edges of the graph-structure in association with the respective costs and the vertices of the graph-structure in association with the respective global penalty scores;

at a given moment in time during operation of the SDC when the SDC is located at a current location between the origin location and the destination location, acquire at least one lane path for the current location,
the at least one lane path being indicative of a respective lane segment extending from the current location without a lane-changing maneuver;

for each one of the at least one lane path:

identify a series of vertices from the graph-structure covered by the respective lane segment of a respective lane path,
a given series of vertices (i) beginning at a current vertex associated with a respective potential location that corresponds to the current location of the SDC, and (ii) ending at a respective end vertex associated with a respective potential location that corresponds to an end of the respective lane segment;

apply a local scoring model onto the graph-structure,
the local scoring model for assigning additional costs to lane-path-departing edges of the series of vertices,
the lane-path-departing edges connecting the series of vertices with other vertices of the graph-structure excluding the series of vertices,
thereby determining locally-increased costs of the lane-path-departing edges of the series of vertices;

determine a locally-adjusted penalty score for each vertex in the series of vertices,
a given locally adjusted penalty score for a respective vertex being a lowest cumulative cost of edges connecting the respective vertex and the destination vertex;

identify a lane path score for the respective lane path, the lane path score for the respective lane path being the locally-adjusted penalty score of the current vertex in the series of vertices of the respective lane path,
the lane path score being indicative of a cost for the SDC for following the lane segment of the respective lane path without performing the lane-changing maneuver, wherein the at least one lane path is a first lane path and a second lane path, and wherein the electronic device configured to determine the lane path score comprises the electronic device being configured to determine a first lane path score for the first lane path and a second lane path score for the second lane path, and wherein the electronic device is further configured to:

use the first lane path score and the second lane path score for selecting a target lane path amongst the first lane path and the second lane path,
the target lane path being associated with a lowest one amongst the first lane path score and the second lane path score;

generate a trajectory for the SDC along the lane segment of the target lane path; and control the operation of the SDC such that the SDC follows the trajectory along the lane segment of the target lane path.

10. The electronic device of claim 9, wherein the series of vertices of the respective lane path includes a first vertex and a second vertex, the first vertex and the second vertex being included sequentially after the current vertex in the series of vertices, and wherein the additional cost assigned to at least one-path-departing edge of the first given vertex is smaller than the additional cost assigned to at least one lane-path-departing edge of the second given vertex,
thereby the electronic device is configured to increase costs of early departures from the lane segment of the respective lane path than the costs of later departures from the lane segment of the respective lane path.

11. The electronic device of claim 9, wherein the at least one lane path is a plurality of lane paths, the electronic device being further configured to:

rank the plurality of lane paths based on the respective lane path scores such that a given lane path amongst the plurality of lane paths associated with a lowest lane path score amongst the respective lane path scores is ranked as a highest one amongst the plurality of lane paths.

12. The electronic device of claim 9, wherein the first set of criteria is indicative of that a given transition corresponding to the SDC keeping its lane is more desirable than an other given transition corresponding to the SDC performing a lane-changing maneuver.

13. The electronic device of claim 9, wherein the first set of criteria is indicative of that a given transition corresponding to the SDC performing a slow lane-changing maneuver is more desirable than an other given transition corresponding to the SDC performing a rapid lane-changing maneuver.

14. The electronic device of claim 9, wherein the electronic device configured to apply the local scoring model onto the graph-structure comprises the electronic device being configured to identify which edges of the graph-structure correspond to lane-path-following edges of the series of vertices and which edges of the graph-structure correspond to lane-path-departing edges of the series of vertices.

15. The electronic device of claim 9, wherein the first lane path amongst the at least one lane path is associated with a first series of vertices and the second lane path amongst the at least one lane path is associated with a second series of vertices, and wherein the first and the second series of vertices comprise at least one common vertex from the graph-structure, and wherein the lane-path-departing edges of the at least one common vertex from the first series of vertices for the first lane path are different from the lane-path-departing edges of the at least one common vertex from the second series of vertices for the second lane path.

16. The electronic device of claim 9, wherein the electronic device is further configured to:
  determine lane path scores for lane paths acquired at respective different moments in time during operation of the SDC.

17. A method of controlling operation of a Self-Driving Car (SDC), the SDC being associated with an electronic device, the electronic device having access to data representative of an origin location and a destination location, the method executable by the electronic device, the method comprising:
  determining, by the electronic device, a route-level navigation information for the SDC to travel from the origin location to the destination location,
    the route-level navigation information being indicative of at least one road that the SDC is to travel on from the origin location to the destination location,
    the at least one road being associated with traffic rules;
  using, by the electronic device, the traffic rules for determining lane-level information,
    the lane-level information being indicative of presence of at least one lane on each of the at least one road;
  using, by the electronic device, the lane-level information for generating a graph-structure,
    the graph-structure including a plurality of vertices and a plurality of edges,
      a given vertex being associated with a respective potential location of the SDC on a given lane of a given road of the at least one road,
        the plurality of vertices including an origin vertex associated with the origin location and a destination vertex associated with the destination location,
      a given edge connecting a respective pair of vertices in the graph-structure,
        the given edge being indicative of a transition between the potential location associated with a first one of the respective pair of vertices and the potential location associated with a second one of the respective pair of vertices;
  applying, by the electronic device, a global scoring model onto the graph-structure,
    the global scoring model being associated with a first set of criteria for assigning costs to respective edges,
      a given cost assigned to a respective edge being indicative of a desirability of the respective transition in accordance with the first set of criteria;
  storing, by the electronic device, the edges of the graph-structure in association with the respective costs;
  at a given moment in time during operation of the SDC when the SDC is located at a current location between the origin location and the destination location,
  acquiring, by the electronic device, at least one lane path for the current location,
    the at least one lane path being indicative of a respective lane segment extending from the current location without a lane-changing maneuver;
  for each one of the at least one lane path:
  identifying, by the electronic device, a series of vertices from the graph-structure covered by the respective lane segment of a respective lane path,
    a given series of vertices (i) beginning at a current vertex associated with a respective potential location that corresponds to the current location of the SDC, and (ii) ending at a respective end vertex associated with a respective potential location that corresponds to an end of the respective lane segment;
  applying, by the electronic device, a local scoring model onto the graph-structure,
    the local scoring model for assigning additional costs to lane-path-departing edges of the series of vertices,
      the lane-path-departing edges connecting the series of vertices with other vertices of the graph-structure excluding the series of vertices,
        thereby determining locally-increased costs of the lane-path-departing edges of the series of vertices;
  determining, by the electronic device, a local penalty score for each vertex in the series of vertices based on the locally-increased costs of the lane-path-departing edges of the series of vertices,
    a given local penalty score for a respective vertex being a lowest cumulative cost of edges connecting the respective vertex and the destination vertex;
  identifying, by the electronic device, a lane path score for the respective lane path,
    the lane path score for the respective lane path being the local penalty score of the current vertex in the series of vertices of the respective lane path,
    the lane path score being indicative of a cost for the SDC for following the lane segment of the respective lane path without performing the lane-changing maneuver,
  the at least one lane path is a first lane path and a second lane path, and wherein the determining the lane path score comprises determining a first lane path score for the first lane path and a second lane path score for the second lane path, and wherein the method further comprises:
    using, by the electronic device, the first lane path score and the second lane path score for selecting a target lane path amongst the first lane path and the second lane path,
      the target lane path being associated with a lowest one amongst the first lane path score and the second lane path score;
    generating, by the electronic device, a trajectory for the SDC along the lane segment of the target lane path; and
    controlling, by the electronic device, the operation of the SDC such that the SDC follows the trajectory along the lane segment of the target lane path.

* * * * *